INVENTORS
GEORGE HARRISON
BY NELSON K. HARRISON

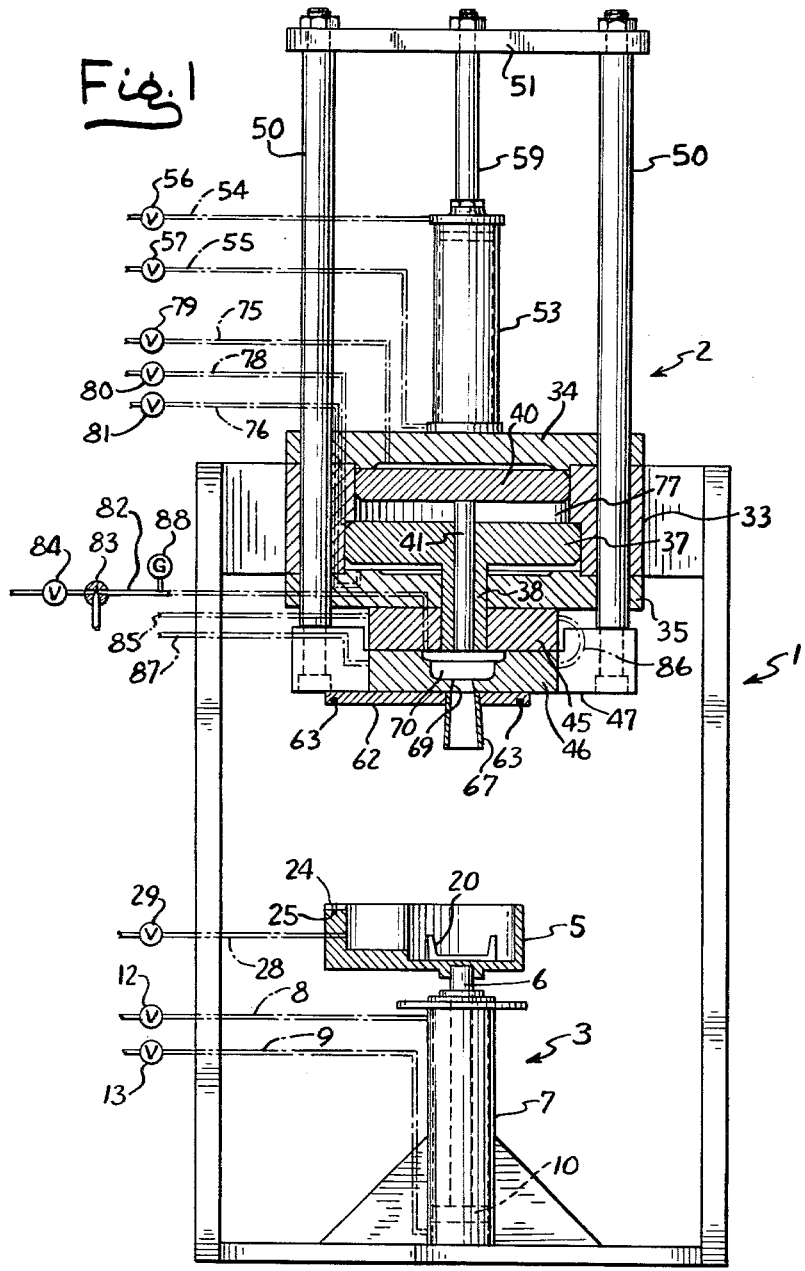
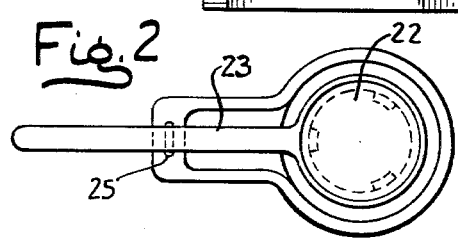

Morris Spector
ATTY.

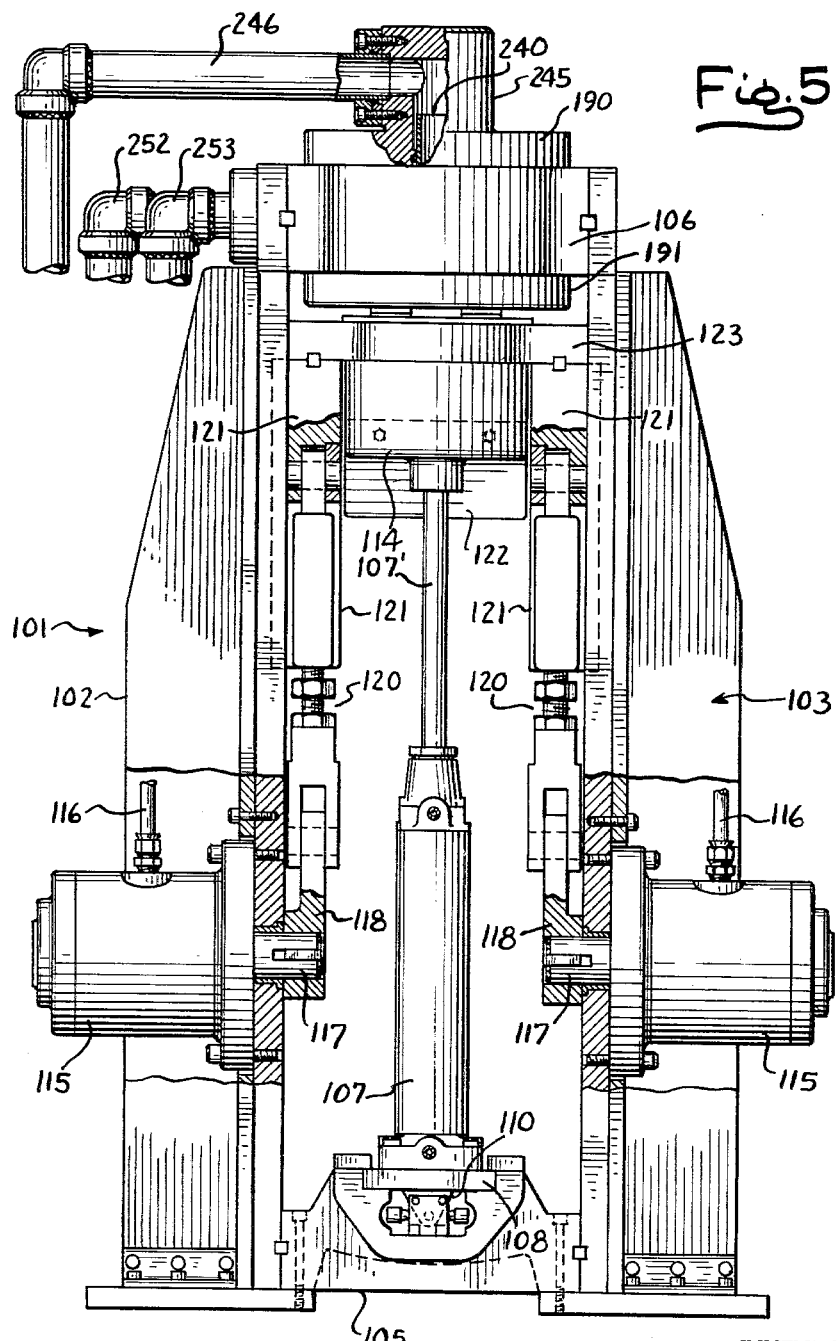

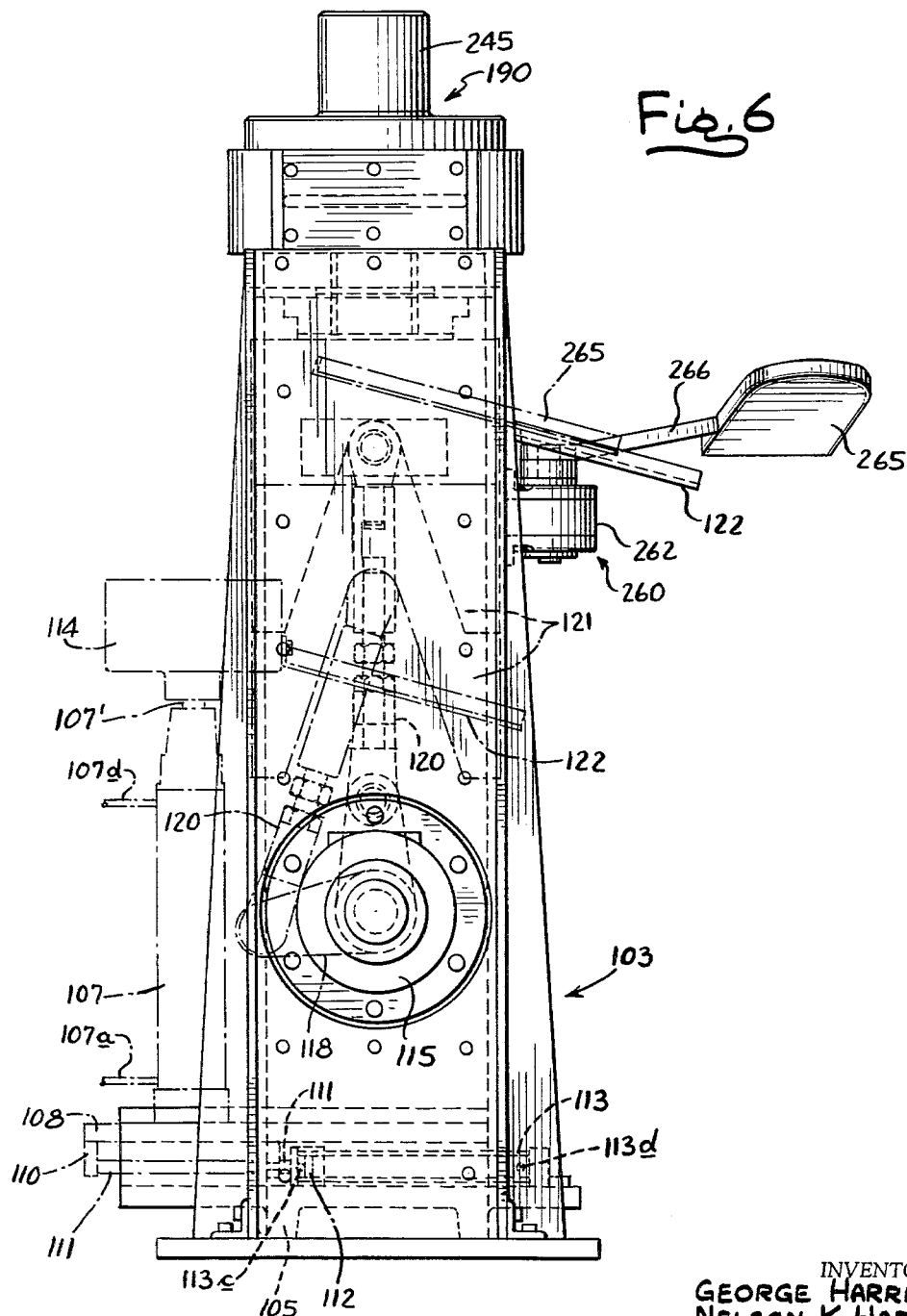

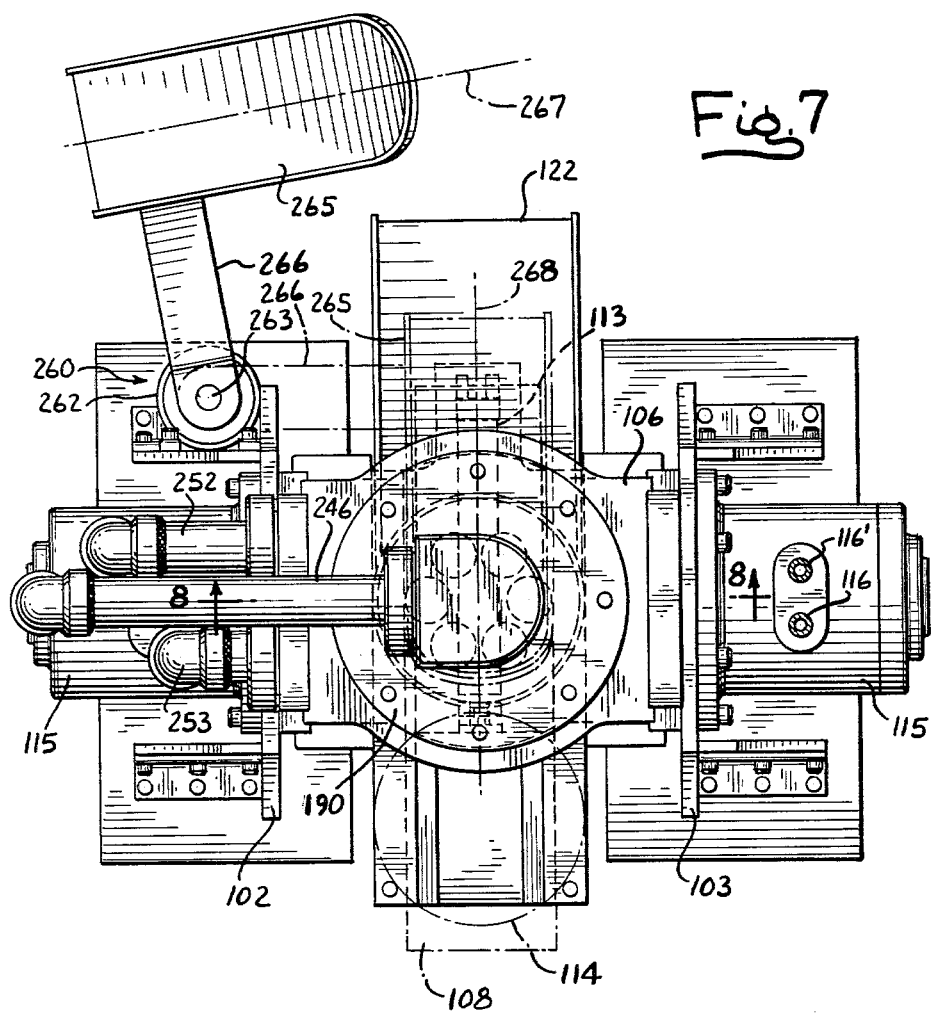

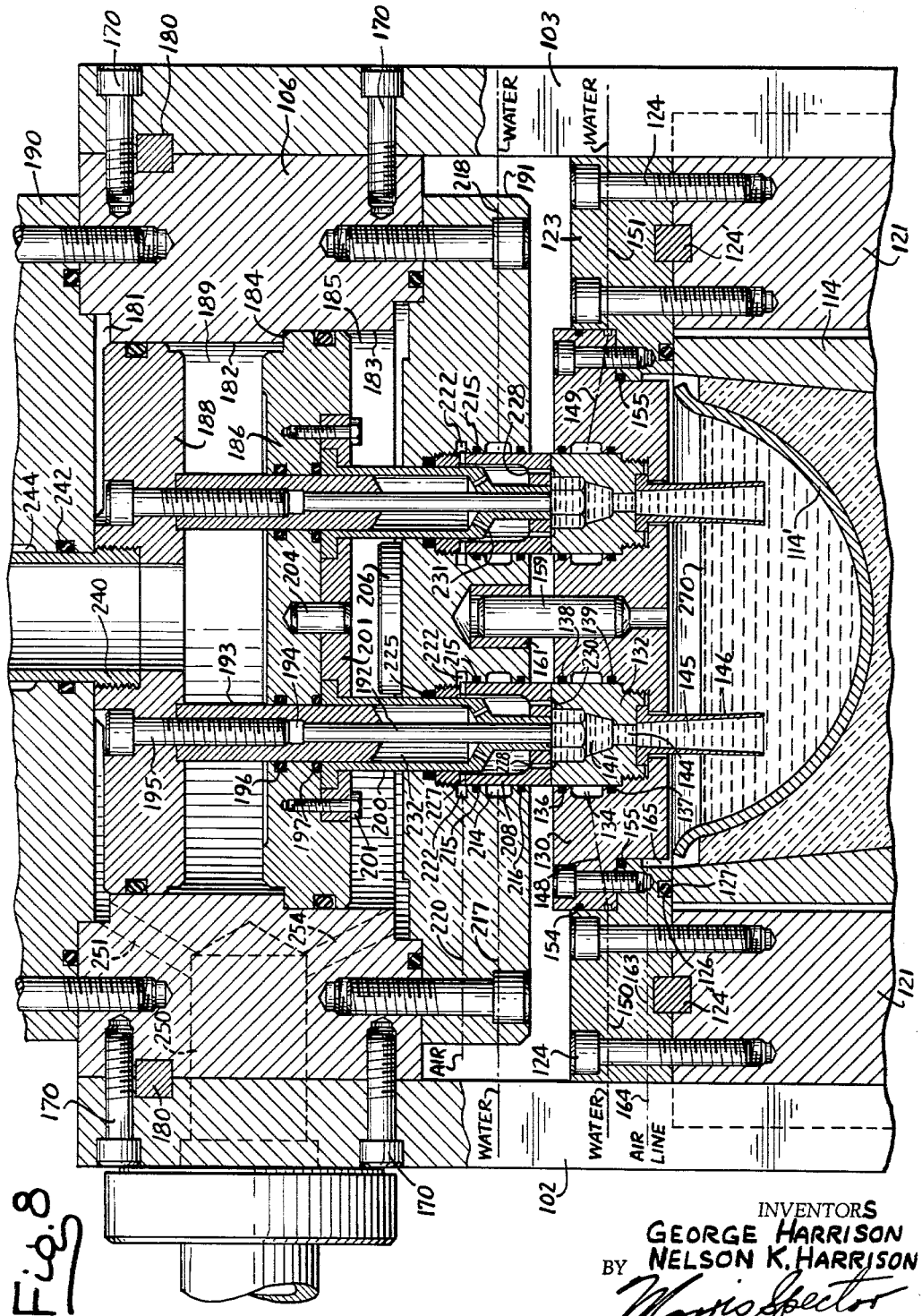

Jan. 11, 1966  G. HARRISON ETAL  3,228,073
METHOD AND MEANS FOR MAKING METAL FORGINGS
Filed Sept. 1, 1961  10 Sheets-Sheet 7
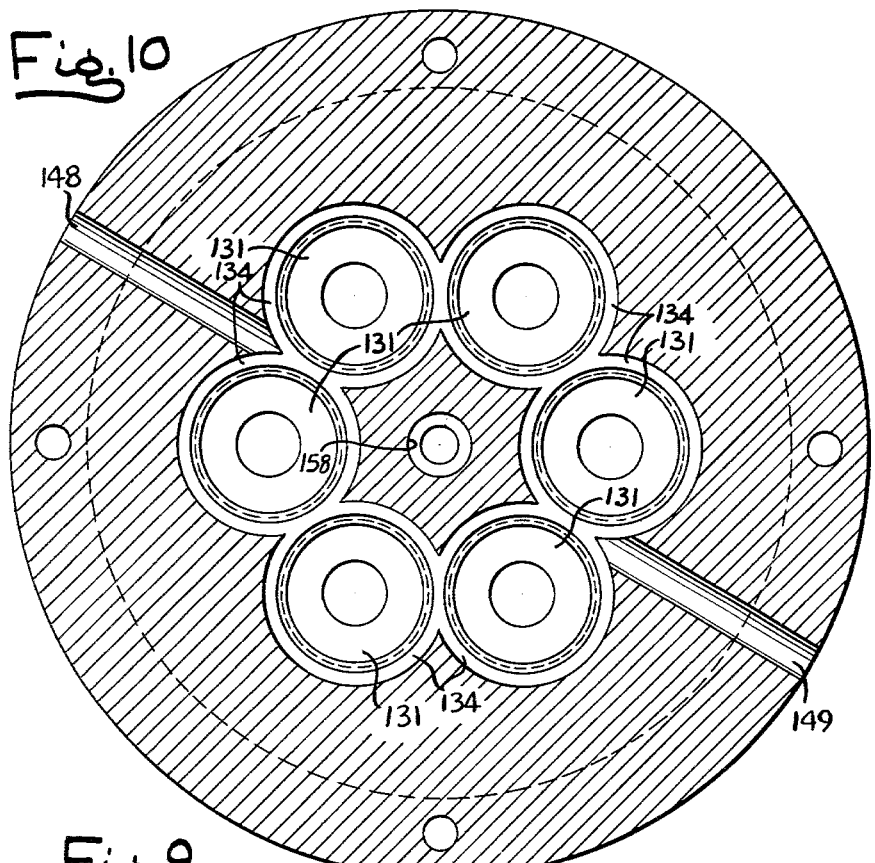
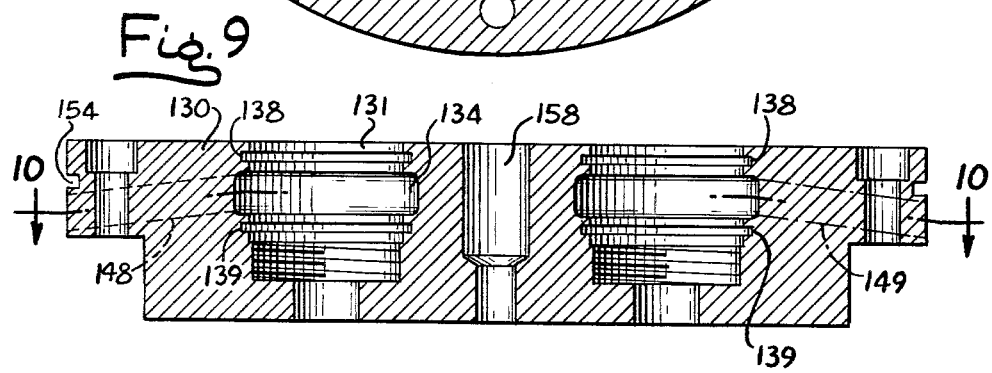
INVENTORS
GEORGE HARRISON
BY NELSON K. HARRISON
ATTY.

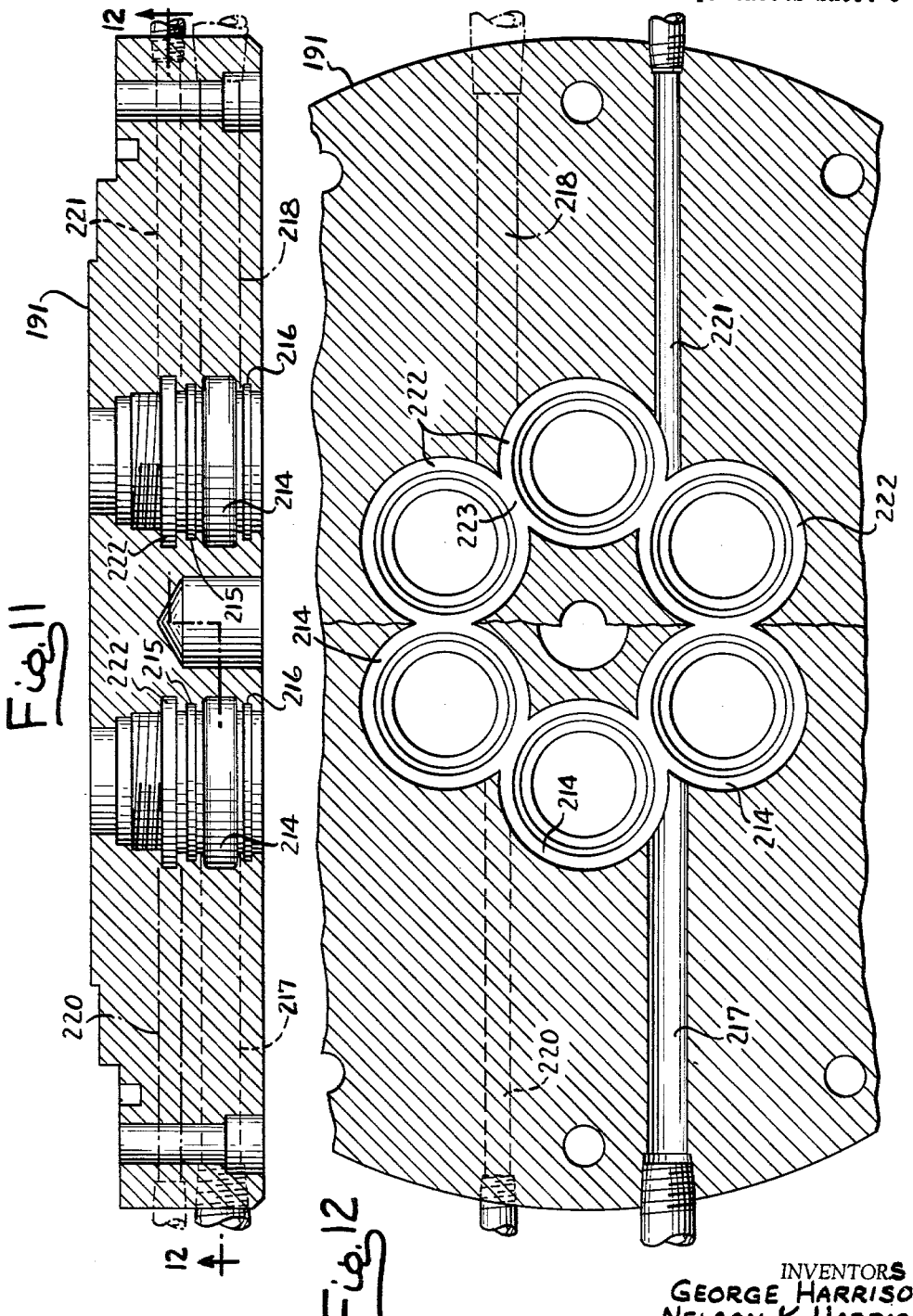

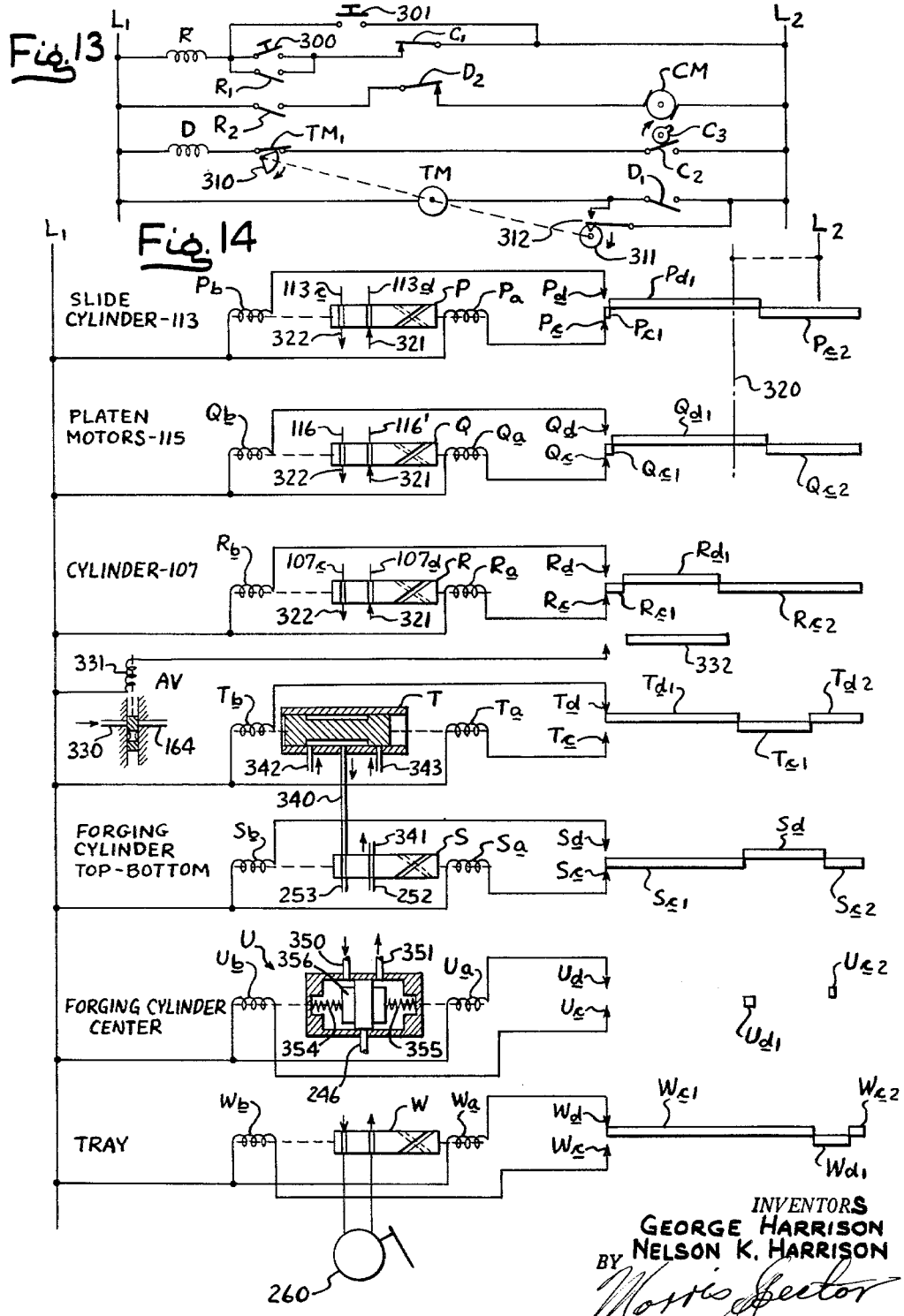

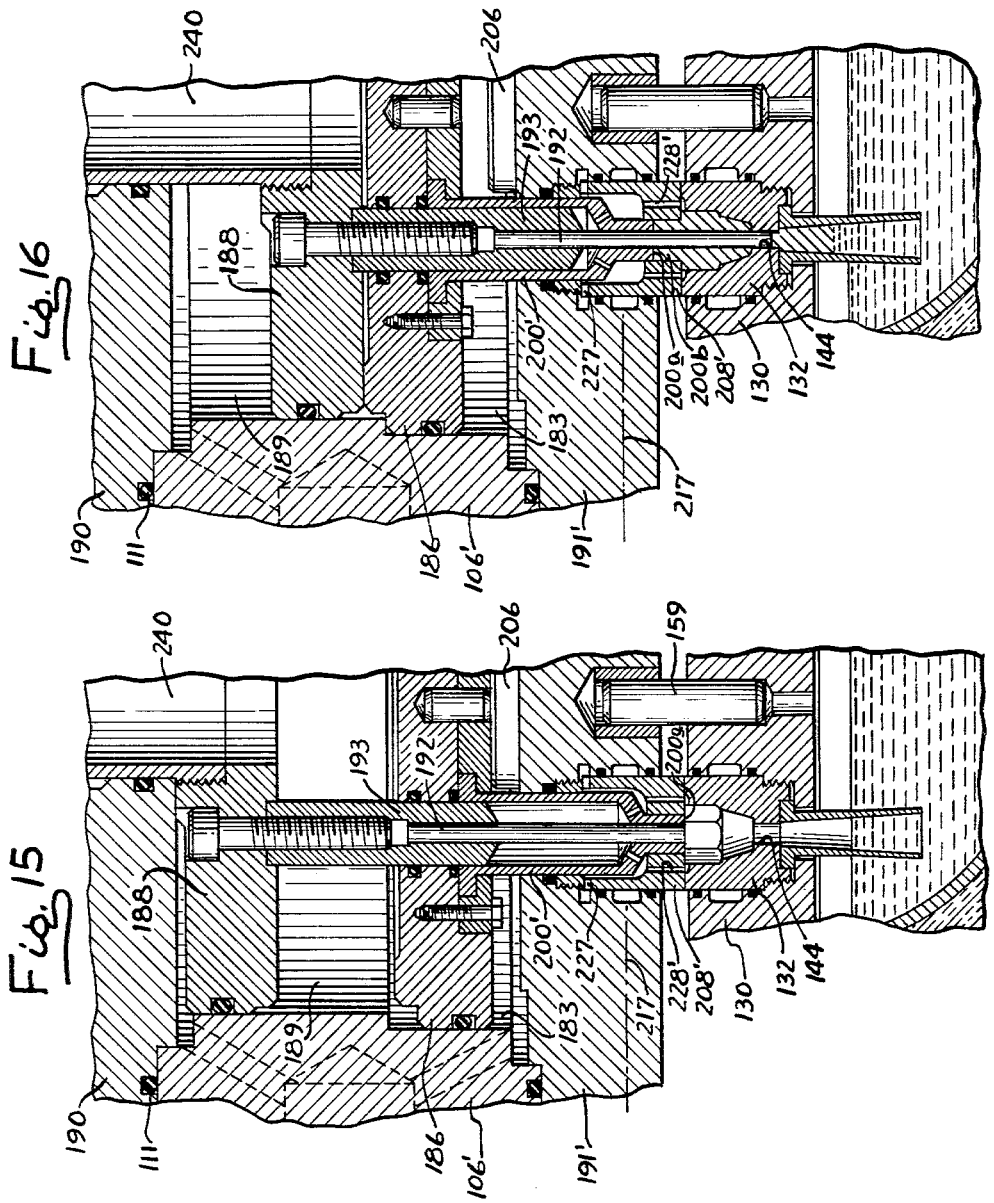

United States Patent Office 3,228,073
Patented Jan. 11, 1966

3,228,073
METHOD AND MEANS FOR MAKING METAL FORGINGS
George Harrison, Berwyn, and Nelson K. Harrison, Riverside, Ill., assignors to Imperial-Eastman Corporation, Chicago, Ill., a corporation of Illinois
Filed Sept. 1, 1961, Ser. No. 146,391
9 Claims. (Cl. 22—73)

This invention relates generally to metalworking, and more particularly to a method and apparatus for making metal forgings from castings that were made in permanent molds.

It is an object of the present invention to provide a method of making metal forgings in which a hot solidified casting is worked while still in the casting mold to cause a more faithful conformance of the metal to the contour of the mold cavity walls.

It is a further object of the present invention to provide a method of the type stated in which the working of the hot solidified casting produces a fine grain structure in the metal, reducing the brittleness thereof and, in many instances, eliminating the need for subsequent heat treating the casting.

It is another object of the present invention to provide a method of the type stated in which the solidified casting may be forged into a desired shape while the casting remains within the mold in which it was formed.

In many instances it is desired to make a casting with a hole or bore therein, and for this purpose a core is used in the mold. As the casting metal solidifies it contracts around the core, and since the core is usually incompressible, stress concentrations are set up around the core resulting in a weakening of the metal of the casting surrounding the bore or hole. Oftentimes the shrinkage may be sufficient to cause the casting to crack. It is an object of the present invention to provide a method of making metal objects by a combined casting and forging operation in which the product may be cast without a bore and then forming the bore by a forging or punching operation while the object is still hot in the mold.

It is still another object of the present invention to provide an apparatus which is capable of efficiently fabricating castings in accordance with the methods of the present invention.

Broadly speaking, the method of the present invention comprises the casting of molten metal in a permanent mold and after the casting has solidified and while it is still in the mold and still retains a large portion of its heat of casting, applying to the solidified casting sufficient mechanical pressure to cause the hot solidified metal to flow to all parts of the casting mold and faithfully conform to the contour of the mold cavity. The mechanical pressure may also forge the solidified casting into a preselected shape, and, if desired, form an opening which extends into or through the casting. In the apparatus of the present invention, the mechanical pressure may be imposed by one or more forging punches. As the punch or punches work the casting, some of the solidified metal may be forced out of the cavity, preferably through the opening through which the mold cavity is filled with molten metal.

In the chill casting of brass, which is a zinc-copper alloy, in permanent molds, a problem arises from the fact that the boiling temperature of zinc is lower than the melting temperature of copper and there is a resulting tendency for some of the zinc to separate from the remaining metal when the liquid metal comes into contact with a cold surface. In casting operations wherein molten metal for casting is in an open top crucible or furnace, any contact of such liquid brass in the crucible or furnace with a cold object tends to cause zinc separation and immediate oxidation thereby producing large amounts of dross in the furnace. It is an object of the present invention to provide a molding process for metal of the above type wherein the liquid metal is removed from the molding furnace in small quantities for delivery to the casting apparatus so that only small quantities of molten metal are subjected at any one time to the cooling action that is involved in the molding operation, thereby reducing the amount of dross formation.

When liquid brass enters a chill casting mold, there is a tendency for some of the zinc to separate from the remaining metal as the liquid metal comes in contact with the cooled mold wall. This condition is sometimes aggravated when a volatile mold release agent is used. As a result, a small amount of zinc, generally in finely powdered form, may appear on the surface of the mold. The quantity formed during each casting operation is very small and in each instance is of itself not significant. However, if these small amounts are permitted to accumulate in the mold from successive operations thereof, the net effect of the accumulation becomes successively worse and therefore it has been a common practice to periodically stop the molding operations to clean the molds. It is one of the objects of the present invention to provide a method of chill casting brass or the like wherein the zinc which separates from the casting metal may be carried away from the mold during each molding operation so that there is no accumulation of zinc within the mold, thereby eliminating the shut-down time that might otherwise be required for the mold cleaning. This is accomplished in accordance with the present invention by subjecting the hot casting within the mold, after solidification of the casting, to a pressure sufficient to force the casting into firm and faithful conformance with the wall of the mold cavity so that the pressure of the hot solidified casting against the wall of the mold cavity causes the zinc precipitate to adhere to the surface of the casting as the casting subsequently cools and shrinks from the wall of the mold cavity, whereby the same is carried away with each casting.

It is a still further object of the present invention to provide a method of casting metal wherein the casting metal is forced into a mold cavity by the application of small smounts of pressure of air or an inert gas and wherein the rate of escape of air or other gases that may be present, or produced in the mold cavity by volatilization of the mold release agent, is withdrawn from the mold cavity by the application of a small vacuum thereto that controls the rate of escape of gases from the mold cavity and therefore controls the rate of flow of liquid metal into the mold cavity in such a manner as to reduce turbulence. The escape of the gases from the mold cavity is through an opening or openings too small to allow the flow of liquid metal therethrough. In the preferred embodiment of the present invention the air flow passageway from the mold cavity extends to a source of high vacuum but the passageway includes a very fine orifice between the exit point of air from the mold cavity and the source of vacuum. This orifice is exceedingly small so as to produce a large choking effect on the gases flowing therethrough. As a result, during normal operation of the system, the pressure in the portion of the air passageway that is between that orifice and the air exit opening or openings in the mold chamber is only very slightly below atmospheric pressure so that only a small but controlled vacuum is, in effect, applied to the mold cavity. However, if the small opening between the mold cavity and that vacuum passageway should become clogged, then the vacuum within that passageway will rise and exert an ever increasing effect tending to clear that passageway which, once cleared, again permits exhaustion of the mold cavity and automatically restores the negative pressure in said passageway to a small amount below atmospheric pressure.

It is a further object of the present invention to provide an improved means for delivering mold release liquid to the mold cavity. This is performed for every five or six mold operations (or more or less frequently as is necessary) by blowing through the normally used exhaust passageways air or another gas at a high pressure, said air being laden with the vapor or minute droplets of the liquid mold release agent.

It is a still further object of the present invention to provide a method of casting metal in permanent molds by providing a mold with a downwardly projecting metal inflow tube that extends into the liquid metal, and then applying pressure to the surface of the liquid metal that surrounds the tube to cause that liquid metal to rise within the tube and into the mold.

It is a still further object of this invention to provide a machine of the type that includes a male punch, with a metal casting mold so arranged that the male punch extends into the mold cavity and can be used to shape or work the metal in the mold cavity. A further object lies in the shaping and locating of the metal gate of the mold in line with the punch and of a shape which is a counterpart of the punch so that the gate constitutes the female member that cooperates with the male punch in its operation of punching a hole through a casting in the mold.

The attainment of the above and further objects of the present invention will be apparent from the following specification taken in conjunction with the accompanying drawing forming a part thereof.

In the drawing:

FIG. 1 is a diagrammatic vertical sectional view showing an apparatus for performing the method of the present invention;

FIG. 2 is a diagrammatic top plan view of the ladle receiving box of FIG. 1 with a ladle therein;

FIG. 5 is a front view of a machine embodying the present invention with some of the parts thereof broken away;

FIG. 6 is an end view of the machine of FIG. 5;

FIG. 7 is a top view thereof;

FIG. 8 is an enlarged longitudinal sectional view taken along line 8—8 of FIG. 7 and showing only the forging cylinder and die holders with their associated dies;

FIG. 9 is a sectional view taken through the lower die holder;

FIG. 10 is a sectional view taken along the line 10—10 of FIG. 9;

FIG. 11 is a sectional view through the upper die holder constituting the lower cylinder head;

FIG. 12 is a fragmentary sectional view taken along line 12—12 of FIG. 11;

FIG. 13 is a circuit diagram illustrating the operation of the cam shaft motor;

FIG. 14 is a diagrammatic illustration of the sequence of operation of the valves of the machine;

FIG. 15 is a fragmentary cross-sectional view of a modified portion of the machine of FIGURE 8; and FIG. 16 is a view similar to FIGURE 15 showing the parts in an alternate position.

Reference may now be made more particularly to the drawings wherein like reference numerals represent like parts throughout.

Figure 3:
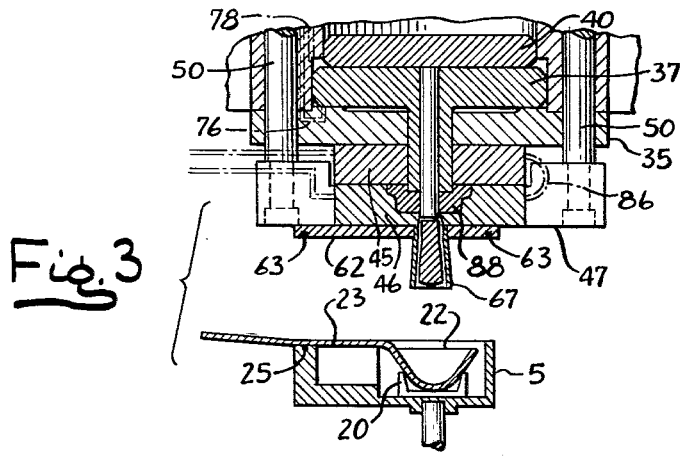
FIG. 3 is a fragmentary view of a portion of the structure of FIG. 1 with the parts thereof moved to an alternating position.

In FIG. 1 the machine is shown in its normal position for receiving a ladle of metal preparatory to starting a cycle for operating the machine. The machine includes a base 1 on which there is mounted metal forging and casting apparatus 2 and supply apparatus 3 for supplying liquid metal to the casting and forging apparatus 2. The metal supply apparatus includes an open top box or cup 5 that is mounted on a piston rod 6 of a hydraulic cylinder 7 that is operated by oil pressure selectively supplied to an oil line 8 or an oil line 9 that lead respectively to opposite sides of a piston 10 within the cylinder 7 for actuating the piston and piston rod in its upward or downward movement, as the case may be. The flow of liquid to the cylinder 7 is controlled by valves 12 and 13 which may be conventional electromagnetically controlled valves or hydraulically or pneumatically controlled valves. The purpose of this arrangement is to raise or lower the box 5 under control of the valves 12 and 13. The box 5 includes a cradle 20 of suitable heat insulating material which is adapted to receive a ladle 22 (FIGS. 2 and 3) containing the liquid metal to be cast, in this instance brass. The ladle includes a handle 23 that rests in a slot 24 at the top of the box on one side thereof, a gasket 25 being interposed. A flexible hose 28 of rubber or the like supplies air under pressure to the inside of the box, the supply of air being controlled by a valve 29.

At the top of the base 1 there is firmly secured an open ended forging cylinder 33 which is closed at its top by a cylinder head 34 and at its bottom by a die carrying cylinder head 35. The upper and lower cylinder heads 34 and 35 are firmly bolted or otherwise rigidly secured to the top and bottom of the cylinder 33. The cylinder 33 has a lower piston 37 slidably mounted therein which piston includes a circular counterbore punch or piston rod 38 that is slidable through the lower cylinder head 35. An upper piston 40 is also slidable within the cylinder 33, said upper piston including a piston rod or through punch 41 that slides through the piston 37 and through the piston rod 38. The lower end of the counterbore punch 38 and the through punch 41 are flush with one another when both pistons are in their elevated positions illustrated in FIGURE 1.

Figure 4:
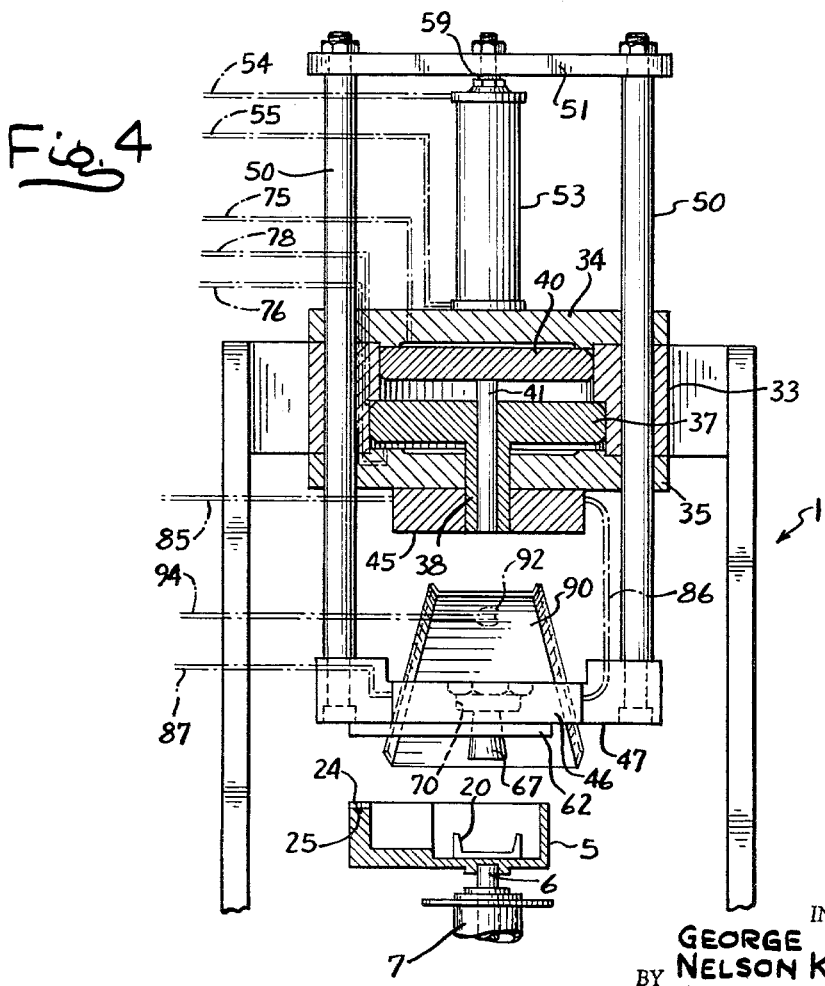
FIG. 4 is a view of the machine of FIG. 1 with the parts thereof in the position immediately following the discharge of a finished forging.

A top molding and forging die 45 is secured to the underside of the lower cylinder head 35. A bottom molding and forging die 46 is secured to or carried by a platen or plate 47 that is in turn carried by a pair of slide rods 50—50 that extend through aligned holes in the cylinder 33 and the upper end lower cylinder heads 34 and 35. The slide rods 50 are connected together by a cross bar 51 at their upper ends. Means is provided for reciprocating the slide bars 50 and thus raising or lowering the bottom molding and forging die 46. This includes a double acting power cylinder 53 that has a double acting piston therein which is moved upwardly or downwardly by pressure such as oil pressure, through lines 54 and 55 respectively, under control of valves 56 and 57 respectively. The piston within the cylinder 53 raises or lowers a piston rod 59 that is connected at its upper end to the cross bar 51. Thus the piston 53 through the slide rods 50 raises or lowers the mold bottom or bottom die 46 from the position illustrated in FIG. 1 to a lowered position as illustrated, for instance, in FIG. 4.

Secured to the bottom side of the die carrying platen 47 is a sealing or gasketing plate 62 that carries a sealing ring or gasket 63 for making an air-tight or semi air-tight fit with the top of the box 5. A thin metal tube 67, the lower end of which is of larger diameter than the upper end, projects downwardly from the bottom of the plate 62 and is adapted to be immersed in the liquid metal in the ladle 22 as will be hereinafter more fully explained. The upper end of the tube 67 opens into a gate 69 that leads to the mold cavity 70. The gate 69 is in line with the punch 41 and of a shape that is the counterpart of the bottom of the punch 41, so that the punch and the gate constitute the male and female parts of a cooperating punch set.

The two pistons 37 and 40 are moved downwardly together (not necessarily at the same speed) by the application of oil under pressure to the portion of the cylinder above the piston 40 as through a hydraulic line 75. The two pistons are moved upwardly together to the position illustrated in FIG. 1 by supplying oil under pressure to the portion of the cylinder 33 immediately below the bottom piston 37, through an oil line 76. The space between the two pistons, indicated at 77, is filled with oil which may move into that space or out of that space through an oil line 78. The lines 75, 76 and 78 are controlled by valves 79, 80 and 81.

An exhaust air line 82, regulated by a needle valve 83 and controlled by a magnetic or pneumatically actuated valve 84, leads to the cavity 70, the exhaust opening or openings being small enough to prevent the flow of liquid metal therethrough but large enough for air to move therethrough.

The top molding and forging die and the bottom molding and forging die are both water-cooled, being supplied with cooling water through lines 85 and 87, respectively.

An explanation will be given of the mode of operation of the machine thus far described. This machine is used for casting a mass of molten metal and forging the casting while it is still in the molding die and still retains its initial heat of casting. The metal used is brass. To commence the operation the tube 67, which is of stainless steel, is preheated so that when the first liquid metal flows upwardly through the tube, the metal will not be excessively chilled. Thereafter, the tube 67 absorbs sufficient heat during each casting operation so that it is maintained sufficiently hot for the next casting operation. Using the ladle 22, a mass of molten metal is dipped from an open top melting furnace or crucible. The ladle is then placed in the box 5, with the spoon portion of the ladle resting on the cradle 20 and the handle portion resting on the gasket 25, the top of the handle of the ladle being slightly below the top at the box 5 at the place where the handle of the ladle extends outwardly from the box. The piston 10 of the cylinder 7 is actuated to raise the box and bring it into engagement with the bottom of the plate 62. The box makes a substantially good fit with the sealing gasket 63 so that there can be only a small leakage of air from the box. At the same time, the tube 67 enters the liquid metal within the ladle. Pressure of air, or of an inert gas such as nitrogen, is then applied to the line 28 to place the interior of the box under an air pressure of a number of pounds, for instance 4 pounds of air pressure. At the same time a small vacuum may be applied to the mold cavity to control the escape of air from the mold cavity. The vacuum is applied through the valve 84 and the line 82 that extends through the lower cylinder head 35 to and through the upper forging die 46 and opens into the cavity 70 through fine openings, as previously stated. If desired, the needle valve 83 may be omitted in which case a smaller vacuum pump will suffice, or the vacuum pump may also be omitted. However, it is preferable to control the air flow by using a source of very high vacuum connected to the valve 84 and throttle the negative pressure to produce in the passageway 82 a pressure only a small fraction of a pound below atmospheric pressure. By this arrangement if there should be clogging of any of the fine air passageways leading from the mold cavity 70, the vacuum in the line 82 will increase almost to the vacuum of the vacuum pump, thereby tending to force the clogging material out and clear the passageways. Also, by this arrangement the negative pressure in the line 82 increases slowly as the mold cavity 70 fills and it reaches its maximum quickly as the cavity completely fills. A pressure gauge 88 therefore indicates a filling of the mold. The needle valve is regulated so that it is almost completely closed. By producing a slight scratch on the needle of the needle valve there is enough leakage past the small scratch when the needle valve is closed to produce the desired choking effect. The gas pressure in the box 5 forces liquid metal to flow from the ladle upwardly through the hot tube 67 into the mold cavity 70 at a rate controlled by the controlled rate of escape of air from the mold cavity so that the flow of metal into the mold cavity is without turbulence. The mold of the present machine is a metal mold and being water-cooled the liquid metal within the mold cavity solidifies rather quickly. Thereafter box 5 is lowered, at least partially, although it may be completely returned to the position of FIGURE 1.

When the box 5 has been lowered from contact with the plate 62 and the metal within the mold cavity has hardened, the machine proceeds to forge the metal casting within the mold cavity. This forging operation is obtained by applying pressure to the top of the piston 40, through the line 75, while the space 77 between the two pistons is full of oil which is held against escape by maintaining the valve 80 closed. The pressure exerted against the top of the piston 40 causes it to descend, causing the punching piston 41 to descend into the metal casting 70. The descent of the piston 40 transmits pressure to the oil in the space 77 which forces the lower piston 37 downwardly, thus causing the counterpunch 38 also to descend into the solidified metal in the mold cavity. The descent of the two pistons produces two results. First, it forges the metal and forces the plastic metal into firm contact with the mold cavity walls. This assures a faithful conformance of the casting with the contour of the walls of the mold cavity. Excess metal that is displaced by the descent of the punch 41 and counterpunch 38 is pushed out or extruded through the gate 69 and the tube 67. The punch 41 descends faster than does the counterpunch 38 because the piston 40 is of a smaller diameter than the piston 37, so that a given descent of the piston 40 produces a somewhat lesser descent of the piston 37 while maintaining the volume of the space 77 between the two pistons constant. Ultimately, the bottom of the piston 37 reaches the cylinder head 35 and can descend no further. This limits the descent of the counterpunch 38 into the casting. The valve 80 is now opened and the continued pressure on the top of the piston 40 causes it to descend until it engages the top of the bottom piston 37. At this time, the bottom of the inner punch 41 has completely penetrated the casting in the molding cavity 70. The solidified metal that has been punched from the casting within the mold cavity drops into the ladle 22.

After the forging operation has been completed, the piston within the cylinder 53 is actuated to move downwardly and, acting through the piston rod 59 and the slide rods 50, it lowers the platen 47 carrying the bottom molding die 46, to separate the bottom molding die from the top molding die. The two molding dies are now in the position illustrated in FIG. 4 while the punch and the counterpunch are in the position of FIG. 3, because as the bottom molding or forging die 46 recedes from the top forging die 45 the casting 88 remains around the punch 41 and the counterpunch 38. A retrieving chute 90 is now moved into position between the top of the lower die 46 and the bottom of the upper molding and forging die 45. Thereafter, by the application of oil pressure to the lines 76 and 78 the two pistons 37 and 40 are raised or returned to the position of FIGURE 1. This strips the workpiece from the punches. The workpiece then drops onto the retrieving chute 90 on which it slides to a collecting bin (not shown).

The retrieving chute 90 carries at 92 a pair of nozzles, one of which is directed upwardly towards the bottom of the top molding and forging die 45 and the other of which is directed downwardly towards the top of the bottom molding and forging die 46. The nozzles 92 are connected through a pipe line 94 to a source of air or other inert gas under pressure, say a pressure of ninety pounds per square inch. Mixed with this gas or air is a mold release agent which comes through the nozzles 92 in the form of a fine spray that covers the mold cavity surfaces. The mold release agent may be any of the known agents for this purpose particularly adapted for use in the chill casting of a metal such as brass. Generally, such mold release agents are also lubricants. It may be a spindle oil such as, for instance, the "Excel" brand of spindle oil of Standard Oil Company of Indiana, or it may be the materail sold as "Cellube" made by Cellanese Corporation of America, or it may be a phosphate ester with chloronated hydrocarbons (Monsanto Chemical Co.'s "Pydroll"), or it may be a mold release agent such as described in the Patents 2,618,530 that issued November 18, 1952, or 2,923,041 that issued February 2, 1960, or 2,592,337 that issued April 8, 1952. The mold release agent is a volatile material and to the extent that it does evaporate during the molding operations the resulting vapor is drawn from the mold cavity by the vacuum in the line 82. We have found that it is not necessary to apply the mold release agent for every operation. It may be supplied once for every few operations, say every third or fourth operation, or even less frequently.

During the casting operation some of the zinc of the casting brass may condense or precipitate out and coat the wall or walls of the mold cavity either with powdered zinc or a compound of zinc. If this is allowed to accumulate within the mold it does become a matter of concern. We have found that this accumulation of zinc or zinc compound within the mold is eliminated by reason of the forging operation. When the punch or counterpunching enters the workpiece it deforms the workpiece into firm, high pressure contact with the wall of the mold cavity and therefore into firm and high pressure contact with any precipitate or condensate of zinc or a zinc compound that may have formed on the mold cavity wall. Later, upon cooling of the casting and consequent shrinking thereof from the mold wall, the receding casting tends to carry with it the powdered precipitate or condensate of the zinc or zinc compound, which then appears as an unobjectionable film or layer on the outside of the finished product.

The sequence of operation of the machine of FIG. 1 is in general as follows. The operator places a ladle of metal onto the cradle 20 in the box 5. Thereafter, the operator commences the cycle of operation of the machine by actuating the valve 13. The piston in the cylinder 7 raises the box 5 to a position where the box engages the gasket 63 of the gasketing plate 62. At this time, or immediately before this position is reached by the box 5, the valve 84 is operated to apply vacuum to the mold cavity 70, and the valve 29 is operated to apply air pressure to the box 5. At the same time, water is being circulated through the molding dies, the water flowing from the line 85 through the die 45 and hose connection 86 to and through the die 46 and then out through the line 87. The liquid metal rises in the mold cavity at a rate sufficiently slow to prevent turbulence of the liquid metal, as controlled by the permissive rate of escape of air from the mold cavity 70. If desired, the vacuum applied by the line 82 may be on all the time since the power required to maintain this air flow at all times is quite low. The vacuum pump draws air at a high vacuum but the permissive rate of air flow through the restricted scratch opening in the needle valve 83 is very low so that only a small vacuum can be built up in the mold cavity during the time the liquid metal is entering thereinto. After a time sufficient for solidification of metal within the mold cavity the piston in the cylinder 7 is actuated to draw the box 5 down.

The forging operation now commences by the actuation of the valve 79 to apply oil pressure to the top of the piston 40. At this time the valve 80 is closed thereby preventing the escape of oil from the space 77 between the two pistons 40 and 37 and the valve 81 is open to permit the escape of liquid from the portion of the cylinder below the piston 37. The descent of the piston 40 thus forces the punch 41 into the solidified metal in the mold cavity, and pressure from the piston 40 is also applied to the incompressible liquid in the space 77 to force the piston 37 downwardly. The piston 37 moves downwardly at a rate slightly slower than the rate of descent of the piston 40 because the piston 37 is of larger diameter than the piston 40. Therefore, the bottom of the punch 41 always reenforces the bottom of the counterpunch 38 as the two descend into the hot casting within the mold cavity 70. This punching operation continues until the piston 37 abuts against the top of the cylinder head 35 whereupon it can descend no more. The valve 80 then opens thereby permitting escape of liquid from the space 77 between the two pistons so that the piston 40 can continue to descend under the continued hydraulic pressure to which it is being subjected. The punch 41 thus continues to descend and to extrude metal through the gate 81. The extruded metal drops into the ladle 22. Thereafter the valve 56 opens to force the piston within the cylinder 53 downwardly, thus drawing the platen 47 and with it the bottom die 46 downwardly. At this time the punch and counterpunch are in the position illustrated in FIG. 3 because they have not yet been retracted to the position of FIG. 1. The metal of the casting 88 grips the punch and counterpunch so that the bottom die 46 is stripped from the casting. At this time a hydraulic mechanism (not shown) moves the inclined chute into a position between the lowered bottom die 46 and the upper die 48. Any desired mechanism for accomplishing this movement may be provided, for instance a mechanism such as shown in the patent to George Harrison 2,863,188 that issued December 9, 1958. Thereafter, pressure on the line 75 is relieved and pressure is applied to the line 76, which causes the piston 37 to rise and also causes the piston 40 to rise. At the same time a small pressure is applied to the line 78, which causes the piston 40 to separate from the piston 37, bringing those pistons back to their position of FIGURE 1 or 4. This strips the casting 87 from the punch and from the counterpunch. The casting then drops onto the inclined chute 90 and slides down this chute to a bin. Thereafter, the chute 90 is retracted and the piston within the cylinder 53 actuated to raise the platen 47 back to the position of FIGURE 1. In the meantime, the operator has manually removed the ladle 22 from the box 5, emptied the ladle of its contents and dipped out a fresh ladle full of metal from the open top liquid metal furnace or crucible and replaced the ladle into the box 5. The operator then again initiates the operation of the machine for a repetition of the cycle above described.

Reference may now be had more particularly to FIGURES 5, 6 and 7 which show, in greater detail, a multiple cavity casting and forging machine embodying the present invention and FIGURES 8 through 12 which show details of that machine. The frame of the machine is indicated at 101. It includes a pair of uprights 102–103 secured together at their lower ends by a base 105 and secured together at their upper ends by a cylinder 106 that corresponds with the cylinder 33 heretofore described but which will be described more fully as this specification proceeds.

The base 105 supports a hydraulic cylinder 107 mounted on a slide plate 108 that is slidable from left to right as seen in FIG. 6 or at right angles to the sheet of paper, as seen in FIG. 5. A slide mount 110 is secured to the slide plate and is connected to a piston rod 111 which is connected to a double acting piston 112 within a cylinder 113 that is bolted to the base 105. By applying oil pressure to the cylinder 113 through a line 113c on one side of the piston 112 the slide plate 108 is movable from its dot-dash position of FIG. 6 to a position between the uprights 102–103. By applying oil pressure through a line 113d on the other side of the piston 112 the piston is returned to the dot-dash position of FIGURE 6. The cylinder 107 has a double acting piston therein the piston rod 107' of which extends upwardly of the cylinder. The piston rod 107' is moved upwardly or downwardly by the application of oil under pressure to the lines 107a or 107d respectively. On the piston rod 107' is mounted a cup 114 carrying an open top crucible 114' (FIG. 8) with suitable heat insulation interposed. A chute 122 is secured to the cup 114 and extends laterally and downwardly therefrom.

Hydraulic power units 115—115 are bolted to the uprights 102–103. Each unit receives oil under pressure through pipe lines 116–116' (FIGURE 7), to oscillate a stub shaft 117 through approximately 100 degrees to turn a crank 118 from its lowered or retracted position shown in dot-dash lines in FIGURE 6, to its upper or extended position shown in FIGURE 5 and in dotted lines in FIGURE 6, and back again. Each crank is connected by an adjustable connecting rod 120 to a slide plate 121 that slides in vertical keyways in the uprights 102 and 103 respectively. The tops of the slide plates 121 are connected by a die carrying platen 123 (FIG. 8) that extends between the plate and is bolted to them by bolts 124 and is maintained in proper alignment by keys 124'.

An annular groove 126 (FIG. 8) is formed in the bottom of the platen 123 and carries an O-ring 127 for forming an air seal with the box containing the molding metal, as will be more fully described as this specification proceeds. The die carrying platen 123 is movable upwardly and downwardly by the two units 115—115. The vertical stroke of the platen is determined by the angular movement of the cranks 118 of the units 115. The ultimate vertical position of the platen is determined by the effective lengths of the adjustable connecting rods 120—120. It is to be noted that each of the slide plates 121 is of a considerable vertical length for accurate guiding of the slide plates during their vertical movement in the guideways in the uprights 102–103.

A die holder 130 of a construction shown more particularly in FIGS. 9 and 10 is bolted in position in the die carrying platen 123. The die holder 130 is of a circular shape and includes a series of six uniformly spaced die receiving openings 131 in each one of which is screw threaded a die 132 of copper or other high heat conducting material. Each opening 131 has an enlarged circular water cooling space 134, the spaces 134 of adjacent die openings overlapping so that all of the six water cooling spaces 134 are in communication. Each die 132 fits snugly within its opening 131. Each water space 134 at each die is sealed by upper and lower O-rings 136–137 in peripheral grooves 138–139 in the die holder. Each die 132 in this case has a mold cavity 141 of the desired shape. In this instance the shape of the cavity happens to be hexagonal at its upper end, which hexagon opening can be used to receive a wrench for turning the die to thread it into the die holder. Each die 132 has a gate 144 that communicates with an opening 145 in a flanged thin walled die steel tube 146 that is held in place by the die 132 threaded into the die holder. The tube 146 may be of chrome steel. It may be of any metal that has the necessary strength at the temperatures involved and which does not react with, or reacts only very slowly with, the liquid metal being cast. An alloy having a base predominantly of nickel, and with chromium cobalt constituting a major part of the remainder has been found suitable. Such metal is known in the trade as Rene 41.

The die holder 130 has two bores 148–149 (FIG. 10) diametrically spaced and extending from the periphery of the die holder to the water cooling space 134. These openings register with bores 150 and 151 in the platen 123 to which are connected water inlet and water outlet hoses for circulating cooling water in the spaces 134 surrounding the bottom dies 132. Suitable O-rings in grooves 154 in the die holder and 155 in the platen 123 form water-tight seals on opposite sides of the communicating connection between bores 148–150 and 149–151.

The lower die holder has a bore 158 for receiving a centering dowel 159 which is in vertical alignment with a dowel bearing 161 carried by the upper die which is of a construction that will be presently explained.

The platen 123 has a bore 163 that extends from the outer periphery of the die holder where it receives connection with a low pressure air line 164 and at its inner end communicates with an annular space 165 between the platen and the die holder at the bottom of both thereof.

An explanation will now be given of the construction of the forging cylinder 106. The cylinder body 106 is bolted or otherwise rigidly secured to the uprights 102–103 as by bolts 170 and aligning keys 180—180. The cylinder has an upper cylinder bore 182 and a lower cylinder bore 183, the upper cylinder bore being of slightly smaller diameter than the lower cylinder bore, thus leaving an annular shoulder 184 that constitutes a stop for limiting the upward movement of a bottom piston 186 that slides within the lower cylinder bore.

A top piston 188 is movable within the upper cylinder bore 182. A top cylinder head 190 extends across the top of the cylinder bore and is bolted to the cylinder. A bottom cylinder head 191 extends across the lower cylinder bore 183 and is suitably bolted to the cylinder 106. The two pistons divide the inside of the cylinder into a top space 181 for receiving fluid pressure for moving the pistons downwardly, a bottom space 185 for receiving fluid pressure for moving the pistons upwardly, and an intermediate space 189 for controlling the movement of the pistons towards and from one another.

The top piston carries a set of through punches 192, one for each die 132. Each through punch extends through a sleeve 193, the top of the punch having a head 194 that rests on a shoulder in the sleeve. The sleeve 193 is held against the bottom of the top piston by a bolt 195 that threads into corresponding threads in the sleeve 193. Each sleeve 193 is circular in cross section and slides snugly through a hole in the lower piston 186, suitable sealing O-rings 196, 197 being provided for making a sealing fluid tight fit between the sleeve 193 and the piston 186. Each sleeve 193 extends into a counterbore punch 200 that is secured to the underside of the bottom piston 186 as by a counterbore punch holding ring 201 that has a series of properly spaced holes therein each for receiving one of the counterbore punches 200 that are spaced apart the same as the spacing of the dies 132. After the counterbore punches 200 are assembled in the ring 201 that ring is bolted to the underside of the piston 186, a suitable dowel 204 being provided for properly positioning the ring 201 with respect to the piston. A suitable spacer washer 206 is secured to the top of the cylinder head 191 for limiting the downward movement of the bottom piston 186 as required by the particular product that is to be forged by the dies.

The lower cylinder head carries copper dies 208 in number and spacing equal to the dies 132 and each in alignment with one of the dies 132. Each die 208 is screw threaded into the cylinder head 191. The cylinder head 191 has a water cooling space 214 similar to the water cooling space 134 in the die holder 130. There are suitable O-rings in grooves 215 and 216 in the bottom cylinder head 191 each pair of O-rings surrounding one die 208 above and below the water cooling space 214. The water cooling spaces 214 surrounding the respective dies 208 merge with one another in the same manner as do the water cooling spaces 134 previously described and are supplied with cooling water for cooling the dies 208. To that effect, the bottom cylinder head 191 has water inlet and outlet passageways 217–218 illustrated in FIG. 12 that communicate with the cooling spaces 214. Those passageways terminate in tapped openings for receiving tapped water inlet and water outlet pipe lines. The bottom cylinder head also has two vacuum air line ports 220–221 which communicate with cylindrical grooves 222 in the bores that receive the dies 208. The cylindrical grooves 222 of the adjacent die receiving bores overlap one another as indicated at 223 in FIG. 12 so that when vacuum is applied to one of the grooves 222 it is applied to all of the grooves. The O-rings in the grooves 215 seal against communication between the water cooling spaces 214 and the air grooves 222. A suitable O-ring 225 surrounds the counterbore punch 200 and seals against communication between the groove 222 and the lower cylinder bore 183 along the opening in which the counterpunch 200 slides.

The vacuum carrying cylindrical grooves 222 communicate with holes 227 in the corresponding dies 208, leading to the interior of the dies. Each die 208 has a series of small holes 228 that open on the flat bottom face thereof. Each of these holes is of very small diameter, so small that liquid metal will not pass therethrough but air will. The top of the bottom die has a very shallow peripheral groove 230 surrounding and communicating with the mold cavity 141. This groove is of exceedingly small height, sufficiently small so that liquid metal will not enter it but air can flow therethrough, thus providing a passageway from the mold cavity 141 to the holes 228 that lead to the interior of the die 208 and thence communicate with the air passageway 220. Each counterbore punch also has a series of holes 231 for establishing communication between the interior space 232 of the counterbore punch and the interior of the bore of the upper die 208. This permits the escape of air from the interior of the counterbore punch 200 as the through punch 192 descends.

The top piston 188 carries a top piston tube 240 threaded therein which slides in the top cylinder head 190 and is sealed with respect thereto by an O-ring in a peripheral groove 242. The top piston tube 240 provides for communication with the intermediate space 189 between the pistons 186 and 188. The top of the sliding top piston tube opens in a pocket 244 in an upstanding portion 245 of the top cylinder head 190 which pocket is in communication with a pipe 246 for bringing oil under pressure to the space 189 or receiving oil from the space 189.

The cylinder 106 has at one end thereof a bore 250 which, through a passageway 251, leads to the space 181. The bore 250 is connected with a pipe 252 for supplying oil under pressure to the space 181 for actuating the piston 188, or for receiving oil from said space when the piston is being raised, as will be hereinafter explained. A bore similar to the bore 250 but formed in front of it communicates with an oil supply pipe 253 for receiving oil under pressure from said pipe 253 and communicates through a bore 254 in the cylinder with the space 183 below the bottom piston 186.

A hydraulically operated chute actuating mechanism 260 is mounted on one of the side frames of the machine. This mechanism includes a hydraulic motor 262 that is adapted to oscillate a stub shaft 263 through an angle slightly in excess of 90 degrees from a retracted position illustrated in FIG. 7, in a direction clockwise as seen in FIG. 7 to an operative position as seen in dotted lines in FIG. 7. A chute 265 is carried by an arm 266 which in turn is keyed to the stub shaft 263. Actuation of the motor 262 causes it to move the shaft 263 clockwise from the position of FIG. 7 to bring the chute 265 into position between the uprights 102–103 and with the center line 267 of the chute as seen in FIG. 7 into coincidence with the center line 268 (FIG. 7) of the machine. This is done only when the cylinder 107 that carries the molten liquid is in the position illustrated in dot-dash lines in FIG. 6 and units 115—115 have moved the slide plates 121–121 to their lowered position, so that the chute 265 moves into the space between the upper dies 208 and the lower dies 132. The chute 265 is provided for receiving the forgings as they are dropped from the machine, in a manner to be hereinafter explained, the forgings then sliding down the chute to a retrieving bin.

An explanation will now be given of the manner of operation of the machine of FIGS. 5, 6 and 7 insofar as that explanation is necessary to supplement the explanation given of the machine shown diagrammatically in FIG. 1.

At the commencement of operation the metal tubes 146 have been pre-heated, as by means of a blow torch. This is necessary only to prevent chilling of the casting metal as it flows through these tubes during the first few casting operations. Thereafter the tubes 146 receive enough heat from the liquid metal during each cycle of operation of the machine to maintain themselves sufficiently hot to prevent chilling of the casting metal.

At the commencement of operations the hydraulic cylinder 107 that carries the cup 114 is in the position illustrated in dot-dash lines in FIG. 6 and contain the crucible 114′ filled with enough liquid metal therein for a number of operations of the machine. At this time the slide plates 121 are in their lowered or dot-dash position of FIG. 6 and the chute 265 may be considered as being in its retracted position which is the position shown in FIG. 7.

The operator commences the cycle of operations to start the machine. This causes the application of pressure to the units 115—115 to rotate the stub 117 and, through the cranks 118 and connecting rods 120 to raise the slide plates 121 to the position illustrated in full lines in FIG. 5, which is the position also illustrated in FIG. 8 and which is the position illustrated in dotted lines in FIG. 6. At this time the crank 118 is in the position of toggle with its connecting rod 120 as illustrated in FIG. 6, or very slightly past that position, and the die carrying platen 123 is pushing the dies 132 with very large pressure against the bottom of the top dies 208. The toggle between the cranks 118 and their respective connecting rods 120 maintains this enormous pressure between the dies so long as the slides are in their elevated position, thereby preventing separation of the dies during the subsequent forging operation, which will be more fully set forth. To obtain further assurance of this the operating oil pressure is maintained on the units 115 during the subsequent forging operation.

While the units 115—115 are raising the slides 121, or immediately thereafter, oil pressure is applied to the piston in the cylinder 113 to move the slide plate 108 that carries the cylinder 107 to the right as seen in FIG. 6 into a position where the longitudinal center line of the cylinder 107 coincides with the longitudinal center line of the forging cylinder 106. Oil pressure is then applied to the cylinder 107 to cause the piston therein to raise the cup 114 to its uppermost position where it engages the gasket 127 and forms a seal between the interior of the cup and the platen 123. During this time, vacuum was being applied to the air line 220, which vacuum is communicated to the molding cavities 141, and air pressure of the order of approximately four pounds per square inch is applied to the air line 164 which communicates through the bore 163 with the space above the level 270 of liquid metal in the crucible 114′. Liquid metal now enters through the respective tubes 146 into the respective mold cavities, the rate of liquid rise within the mold cavities being controlled by the restricted rate of air escape from the mold cavities so as to produce a non-turbulent rise of liquid metal within the water-cooled casting dies 132. The vacuum is applied in the same manner as in FIGURE 1. When the mold cavity fills, the vacuum measured by the gauge 88 increases enormously because of the stoppage or substantial reduction in air flow. At this time the pistons 186 and 188 are in the positions illustrated in FIG. 8, with the bottom of the punch 192 flush with the bottom of the counterpunch.

After a time elapse sufficient for the die cavities to fill with molten metal, and for the molten metal to solidify within the mold cavities 141, the piston within the cylinder 107 is actuated to lower the cup 114. When this has been done, the piston 112 in the cylinder 113 is actuated to return the slide 108, which carries the cylinder 107 back to the position illustrated in dot-dash lines in FIG-URE 6. This brings the top of the crucible 114' to a position where it is accessible to the operator during the remainder of the cycle of operation of the machine. The operator may supply the crucible 114' with additional liquid metal (as by ladling it from an adjacent furnace), should replenishment be necessary, and skim off any dross that may have formed on the top of the liquid in the crucible. At the same time the chute 122 that is carried by the cup 114 is moved to a position immediately below the tubes 146.

The machine now commences to perform the forging operations. While this is being done, the pipe 246 is maintained closed against the escape of oil from the space 189 and the pipe 253 is maintained open to permit escape of oil from the space 185. Oil under the necessary pressure, which may be of the order of 2500 pounds per square inch, is then applied through the pipe 252 to the space 181. This forces the piston 188 downwardly. Since the oil in the space 189 is confined, and is incompressible, downward movement of the piston 188 causes downward movement of the piston 186 at a slightly lower speed because the piston 186 is of a slightly larger diameter than the piston 188. The punch and the counterpunch now move downwardly together. It is permissible that the punch 192 shall advance with respect to the counterpunch but it is not permissible that the counterpunch shall advance with respect to the punch because if that were to happen then the very bottom of the counterpunch would no longer be supported by the punch against radially inward collapse and such collapse might take place. By keeping the bottom of the punch 192 always at or below the bottom of the counterpunch we are assured that the punch will always reenforce the counterpunch against inward collapse.

The downward movement of the punch (and the counterpunch) is commenced after the cast metal in the die cavity has solidified but while it is still at a very high temperature. During the casting operation, where the metal being cast is an alloy of copper and zinc, such as brass, there is a tendency for some of the zinc to separate out as the liquid metal comes in contact with the cold metal walls of the dies 132. As the liquid metal solidifies in the mold cavity and shrinks from the mold cavity wall, some of the separated zinc or zinc compound tends to remain in contact with the mold cavity wall. Thereafter, during the forging operation the first effect of the descending punch and counterpunch is to force metal of the casting into firm pressure contact with the wall of the die cavity. This not only causes faithful conformance of the casting with the mold cavity wall or walls but also causes some or most of the zinc that has separated from the casting metal to adhere to the surface of the casting and be carried with it from the mold when the casting and mold separate. In addition, there is a working of the cast metal by the forging operation thereby producing a finer grain structure in the casting. Further descent of the punch and counterpunch forces the excess metal through the gate 144.

The counterpunch continues to descend with the punch until the counterpunch holding ring 201 engages the spacer 206 which acts as a stop limiting the descent of the piston 186 and the counterpunch. Thereafter a valve which controls oil flow from the pipe 246 is opened to permit the escape of oil from the space 189. This permits further descent of the top piston 188 under the oil pressure exerted in the space 181. The punch continues to descend until the top piston 188 reaches the limit of its stroke. The bottom of the punch 192 enters the gate 144 which is of a shape that is a counterpart of the shape of the bottom of the punching die 192, so that it acts as a female die member for the male punch 192. The metal extruded through the gate 144 drops through the tube 146 onto the chute 122 on which it slides to a retrieving bin from which it can be later taken for re-melting purposes. The chute 122 extends between the slides 121—121 and, being secured to the cup 114, also holds that cup against turning on the piston rod.

When the forging operations above described have been accomplished and the bottom and top pistons 186 and 188 within the forging cylinder 106 are in their lowered positions, the hydraulic units 115—115 are actuated to lower the die carrying platen 123 by moving the slides 121 downwardly from the dotted line position illustrated in FIG. 6 to the dot-dash position shown in FIG. 6. When the slides 121 and with them the dies 132 move downwardly, the metal forging that was within the cavity 141 remains shrunk on the punch and counterpunch. The additional cooling immediately after the completion of the forging operations caused some shrinkage of the casting from the wall of the mold 141. The die 132 can easily slide downwardly from the forging which at this time is held on the punch and counterpunch that are in their lowered positions.

After completion of the punching operations and lowering of the slides 121—121 the chute actuating mechanism 260 is operated to rotate the chute 265 from its retracted position illustrated in FIG. 7 to its operative position wherein its center line 267 of FIG. 7 coincides with the center line 268 of that figure, which is the dot-dash position of FIG. 6. At this time the chute 265 is ready to receive any forging that may be dropped thereonto by the following retraction of the punch and counterpunch.

Thereafter oil under pressure is applied to the pipe 253 that communicates with the space 185 below the bottom piston and to the pipe 246 that communicates with the spaces 189. At the same time the pipe 252 is opened to permit the escape of oil from the space 181. The pistons 186 and 188 therefore return to the position illustrated in FIG. 8 and thus strip each punch and counterpunch from the forging at the bottom thereof. The forging therefore drops, falling onto the chute 265 that has been moved from the position of FIG. 7 to a position immediately below the tubes 146 as illustrated in dot-dash lines in FIG. 6. The forging slides down the chute 265 to a retrieving bin, not shown.

After the forging has slid down the chute 265 to the retrieving bin the motor mechanism 262 is actuated to return the chute 265 to the position of FIG. 7. Thereafter, a blast of air under a pressure of say 80 pounds per square inch is blown through the line 220, to clean the passageways to the mold cavities. After a number of successive operations, say 3 or 4 or 6 operations of the machine, the operator may spray a mold release agent such as was previously described, onto the mold cavity when the upper and lower die members are separated and the casting has been stripped from the punches. This may be done by manually spraying the parted die members. As an alternative it may be possible to incorporate the mold release agent as a mist with the air stream that is blown through the line 220 to clean the air passages after the molding operation.

Reference may now be had to FIGURE 13 showing a preferred circuit diagram for obtaining the desired sequence of operations. To start the cycle of operations, two manually operated switches are provided, either one of which may be operated independently of the other, namely a one cycle operating switch 300, or a repeat cycle switch 301. The switch 300 is one of the type which stays closed only so long as it is depressed and opens as soon as the closing pressure is released. The switch 301 is one that remains in its closed position or its open position until it is manually moved to its alternating position. Assume now that the one cycle operating switch 300 is manually momentarily closed to start the machine. This completes a circuit across the electric power lines $L_1$ and $L_2$ for the relay R, said circuit extending through a normally closed cam shaft operated switch $C_1$ that is actuated by a cam on a cam shaft motor CM. The relay R closes its contact $R_1$, thus completing a locking circuit for itself. The relay R also has a normally open contact $R_2$ which closes upon energization of the relay to complete a circuit for a cam shaft motor CM, said circuit extending through a normally closed contact $D_2$ of a delay relay D. The cam shaft motor now commences operation. One revolution of the cam shaft motor constitutes a completion of one cycle of its operation. At one stage in the operation of the cam shaft motor CM one of its cams closes a contact $C_2$. The time of closure of the cam operated switch $C_2$ is determined by the angular position of a cam $C_3$ on the shaft of the cam shaft motor CM. When the contact $C_2$ closes, it completes a circuit for a delay relay D through a normally closed contact $TM_1$ which is controlled by a cam 310 driven by a timing motor TM. Upon energization of the relay D, that relay at its contact $D_2$ opens the circuit for the cam motor CM, thereby stopping that motor. The relay D also closes its normally open contact $D_1$ and thereby establishes an operating circuit for a timing motor TM. The timing motor commences to operate and at its cam 311 closes a contact 312 which shunts the contact $D_1$ and establishes a holding circuit for itself. The timing motor TM continues to operate until an adjustable cam 310 driven thereby opens the contact $TM_1$, thereby opening the circuit for the relay D. De-energization of the relay D causes the contact $D_2$ to reclose, thereby re-starting the cam shaft motor CM which now resumes its operation and opens the contact $C_2$ so that the relay D is not re-energized by the continued operation of the timing motor TM. The timing motor TM continues to operate until it completes its cycle, whereupon its cam 311 opens the contact 312 thereby stopping the timing motor. The cam shaft motor CM continues to operate until, at the end of its cycle, its cam C opens the contact $C_1$. This opens the circuit for the relay R which de-energizes and at its contact $R_2$ stops the cam shaft motor CM. This completes one cycle of operation of the cam shaft motor and stops the machine if the motor CM has been started by the one cycle operating switch 300. On the other hand, if the machine has been started by the operation of the repeat cycle switch 301, which remains closed, the machine goes through the same cycle of operation previously described except that upon completion of the cycle the opening of the switch $C_1$ is of no effect and the cam motor then goes on to repeat the cycle previously described.

The cam motor M controls the cycle of operation of the machine, as will be more fully set forth presently. The cam $C_3$ thereof determines a time in the cycle of operation of the motor CM when that motor stops. The motor TM through its cam 310 determines the duration of the stop. The arrangement is such that the cam shaft motor CM stops when the mold filling operation commences and it remains stopped for a period of time determined by the setting of the cam 310, which setting is made to allow an adequate time for filling of the mold, depending upon the metal being used, its temperature, and the size or sizes of the molding dies, and the solidification rate of the metal being cast. The remaining operations of the machine, controlled by the cam shaft motor CM, remains the same for each cycle of operation of the machine independently of the time of commencement of the delay and independently of the duration of the delay.

Reference may now be had to FIGURE 14, which shows how the cam shaft motor CM controls the various sequences and durations of the operation of the hydraulic mechanisms previously described. The motor CM has a cam shaft 320, only the center line of which is illustrated, for clarity. It carries a number of cams, each of which actuates a switch that connects the line $L_2$ to its respective circuits. For the purpose of simplicity of explanation each of the cams may be assumed to be connected to the line $L_2$. At the commencement of each cycle of operation the cam shaft 320 is assumed to be in the position illustrated in FIGURE 14 and it is assumed that that has an angular movement of one revolution or 360°. Each of the cams is individually adjustable on the cam shaft both as to time of commencement and duration of its operation.

The operation of the cylinder 113 of FIGURE 6 will now be explained in relation to FIGURE 14. The pipe lines 113C and 113D previously described are adapted to be connected to pipe lines 322 and 321, respectively, or to 321 and 322 respectively. The pipe line 321 is connected to a source of oil pressure of approximately 1,000 pounds per square inch. The pipe line 322 is connected to the oil return reservoir. An electromagnetic valve P is provided for connecting the two lines 113C and 113D to the two lines 322 and 321 respectively, or in reverse relationship. The valve has an operating coil $P_a$ and another operating coil $P_b$. When the coil $P_a$ is energized the valve is moved to the position indicated wherein the lines 113C and 113D are connected to the lines 322 and 321 respectively, whereby the oil pressure is applied to the line 113D which moves the piston 112 (FIG. 6) to the position indicated in dot-dash lines of FIGURE 6. When the electromagnetic coil $P_b$ is energized it moves the valve to the left of the position indicated in FIG. 14 wherein 113C connects with 321 and 113D connects with 322 whereby the cylinder 107 is moved from the dotted line of FIGURE 6. When the coils $P_a$ and $P_b$ are deenergized, the valve remains in the position to which it has been moved. When the timer is in the position illustrated in FIGURE 14, which is the neutral position, the coil $P_a$ is energized and the valve P is in the position illustrated in FIGURE 14. The circuit for the coil $P_a$ is from the line $L_1$, through the coil, to a switch contact $P_c$. The circuit for the valve winding $P_b$ extends to a switch contact $P_d$. The contact $P_c$ is adapted to be engaged by a cam $P_{c1}$ or $P_{c2}$ which are really one continuous cam, $P_{c1}$ extending from the zero point for 5° and $P_{c2}$ extending from the 220° point to the 360° point, the 360° point and the zero degree point being coincident. The switch $P_b$ is actuated by a cam $P_{d1}$ which extends from the 5° point through to the 220° point of operation of the cam shaft. This determines the cycle of operation of the piston 112 (FIG. 6) that controls the movement of the cylinder 107 in its alternate positions.

An explanation will now be given of the cycle of operation of the platen motors 115—115 which are hydraulically connected in parallel with one another. These motors are controlled by a valve Q similar to the valve P and similarly connected to the lines 321 and 322 to supply hydraulic pressure selectively to one or the other of the pipe lines 116 or 116′. This valve is actuated by electromagnetic coils $Q_a$ and $Q_b$ over circuits similar to those previously described for $P_a$ and $P_b$, the switch actuating cams $Q_{c1}$ and $Q_{c2}$ extending respectively from 0 to 10° and from 230° to 360° of the cam shaft so that in effect they extend from the 230° mark through the zero mark to the 10° mark. The switch actuating cam $Q_{d1}$ extends from the 10° mark to the 230° mark. When pressure is applied to the pipe line 116′ the power units are operated to bring the slides 121 and platen 123 carried thereby to their lowered position. When pressure is applied to the line 116 as by energizing the coil $Q_b$, the motor units 115—115 are energized to move the slides 121 and the platen carried thereby to the upper position.

An explanation will now be given of the operation of the piston within the cylinder 107 to raise and lower the cup 114. This piston is controlled by an electromagnetically operated hydraulic valve R similar to the valve P, controlled by windings $R_a$ and $R_b$. The switch actuating cam $R_{d1}$ extends from the 15° point on the cam shaft to the 180° point. The cam $R_{c1}$ and $R_{c2}$, which is in effect one cam, extends to the remainder of the 360°.

When the machine is in the position illustrated which is at the completion of a cycle of operation, the winding $R_a$ is maintained energized, therefore applying pressure to the line $107d$ so that the cup is maintained in its lowered position.

An explanation will now be given of the manner controlling the application of air under pressure (two to six pounds per square inch) to the top of the liquid metal in the cup 114. For that purpose, an air line 330 of the necessary pressure is connected by an electromagnetic control valve AV to the line 164. The valve AV has a winding 331 that is energized by a cam 332 on the cam shaft 320, said cam extending from the 30° to the 170° point on the cam shaft so that the valve 331 is energized during that 140° interval in the cycle of operation. Upon de-energization of the winding 331, the air valve AV closes. The operation of this valve applies the pressure through the line 164 to the space above the top of the liquid in the cup 114.

An explanation will now be given of the operation of the forging punches. The forging punches are controlled by an electromagnetically actuated hydraulic valve S similar to the valves P, Q and R previously described, operated by electromagnetic coils bearing corresponding reference numerals. The coil $S_b$ is energized by a cam $S_d$ that extends from the 190° point to the 310° point on the cam shaft. The electromagnetic coil $S_a$ is controlled by a cam $S_{c1}$ and $S_{c2}$ that extend from the 310° point through the 360° point to the 90° point. Pressure is applied through valve S by a pressure line 340 being applied either to the bottom cylindrical space 185 through the line 253 or the top cylinder space 189 through the line 252, the valve S being provided with an outlet 341 that returns the oil to the oil reservoir. The pipe 340 is adapted to receive oil under pressure of 1,000 pounds from a line 342 or under pressure of 2500 pounds from a line 343, depending upon the position of an electromagnetically controlled hydraulic valve T which has a winding $T_a$ and a winding $T_b$ controlled respectively by a cam $T_{c1}$ that extends from the 185° point to the 285° point on the cam shaft and a cam $T_{d1}$–$T_{d2}$ that extends from the 285° point through the 360° point to the 185° point.

The space 189 is controlled by a valve U. The space is completely closed off, or is connected by a pipe 350 to a source of 1,000 pounds pressure, or to an exhaust 351, as controlled by the electromagnetically actuated valve U. The valve U is controlled by magnetic windings $U_a$ and $U_b$ and compression springs 353 and 355. The compression springs tend to maintain the valve spool 356 centered, said spool being moved to one position or the other by one or the other of the windings $U_a$, $U_b$ and held in that position only so long as those windings are energized. The energization of the winding $U_b$ is controlled by a cam $U_{d1}$ that extends from the 195° point to the 205° point whereas the energization of the winding $U_a$ is controlled by cam $U_{c2}$ that extends from the 315° point to the 320° point.

An explanation will now be given of the manner of operating the motor 260 for operating the retrieving tray 265. The motor is controlled by an electrically operated hydraulic valve W similar to the valve P and operated by magnetic coils $W_a$ and $W_b$. The coil $W_b$ is operated by a cam $W_{d1}$ that extends from the 290° point to the 340° point on the cam shaft. The coil $W_a$ is controlled by a cam $W_{c1}$–$W_{c2}$ that extends through the remaining portion of the 360°.

In the operation of the machine, closure of the starting switch 300 causes the commencement of the cycle. After approximately 5° operation of the cam shaft 320 of the motor CM, the valve operating winding $P_a$ is de-energized and the winding $P_b$ is energized. The valve P now moves leftward to its alternate position. This causes oil pressure to be applied to the line $113c$ to move the piston 112 to the right to move the cylinder 107 to its operative position. A few degrees later in the operation of the cam motor CM the valve Q is operated by de-energization of the operating winding $Q_a$ and the energization of the winding $Q_b$ which causes the valve Q to move to a position opposite that illustrated in FIGURE 14 to operate the motor units 115. A few degrees later the valve R is operated by de-energization of the operating winding $R_a$ and energization of the operating winding $R_b$. The valve P, Q and R remain in their operated new positions and the slide 108 (FIG. 6) continues to move to the right, the slides 121 that carry the platen 123 continue to rise, and the cup 114 continues to rise, each until it reaches its limit of travel. When the cam shaft of the motor CM reaches 30° point of travel it actuates the air valve AV to apply air under pressure to the space above the liquid metal in the crucible 114'. The die cavities in the dies 132 now commence to fill with liquid metal. At this time the cam motor CM is stopped by the action of its cam $C_3$ operating to close the circuit for the relay D (FIG. 13). The mold filling operation now continues and the casting machine proper remains at rest for a time determined by the setting of the cam 310 of the timing motor TM. As soon as this cam operates, it causes re-starting of the cam motor CM for the completion of its cycle. During all of this time, the pistons of the forging cylinder are maintained in their uppermost position by the application of approximately 1,000 pounds of oil pressure from the line 342 (FIG. 14) through the valve T to the valve S and thence to the oil pipe 253 the leads to the space 185 of the forging cylinder. At the same time, the space 181 is connected to the return oil reservoir through the pipe 252, the valve S and the pipe 341 (FIG. 14). When the cam shaft 320 reaches the 160° position it causes de-energization of the winding $R_b$ and energization of the winding $R_a$ of the valve R, thereby returning that valve to the position illustrated in FIGURE 14 and causing oil pressure to be applied to the oil line inlet $107d$ of the valve 107 to lower the cup 114. A few degrees later in the travel of the cam shaft 320 the valve P is energized to return it to the position illustrated in FIGURE 14 where it actuates the piston of the cylinder 113 to commence the movement of the slide 108 to the left to the ultimate position illustrated in dot-dash lines in FIGURE 6.

The machine is now ready to commence the forging operation. When the cam shaft 320 reaches approximately its 185° position, the energization of the valve T is reversed so that its coil $T_b$ is no longer energized and its coil $T_a$ is energized. This moves the valve to the right of the position of FIGURE 14, closing off the 1,000 pound pressure pipe line 342 and connecting the 2500 pound pressure oil pipe line 343 to the line 340. Simultaneously therewith, or a few degrees after this happens, the energization of the valve S is reversed so that its coil $S_a$ is de-energized and its coil $S_b$ is energized, thereby moving that valve to the left of the position shown in FIGURE 14. The high pressure line 340 is now connected to the pipe 252 that leads to the space 189 in the forging cylinder and at the same time the pipe 253 that leads from the space 185 in the forging cylinder is connected to the return flow pipe 341. During the next 5° of operation of the cam shaft of the motor CM the counterbore piston 186 has reached its bottom of travel and when the cam shaft reaches its approximately 195° point, it operates the valve U by energizing the coil $U_b$ thereby moving the spool 356 to the left and establishing communication between the pipe 246 and the pipe 351 that leads to the oil reservoir. The oil and the space 189 is no longer confined and therefore punch piston 188 now continues to descend to the end of its stroke.

The material that is punched from the casting in the cavity of each die 132 by the punch 192 drops through the tube 145 onto the tray 122 that is now in the position illustrated in dot-dash lines in FIGURE 6 and slides along this tray to the end thereof, where it drops onto a collecting bin to be later re-melted.

When the cam shaft 320 reaches its 230° position it reverses the energization of the operating windings of the valve Q and restores that valve to the position illustrated in FIGURE 14, thereby applying pressure to the motors 115—115 to lower the slides 121 and the die carrying platen 130. The dies now descend leaving the forgings impailed on the punches 192. After the platen has reached its lowermost position and when the cam shaft 320 reaches its 290° position, it reverses the energization of the windings $W_a$ and $W_b$ of the electromagnetically controlled valve W which now reverses the power connection to the retrieving tray motor 260, causing that motor to operate to move the retrieving chute 265 from its full line position of FIGURE 7 to its dotted line position, where that tray is immediately below the forgings that are impailed on the punches 192.

When the camshaft 320 reaches its 205° position the winding $U_b$ of the valve U is de-energized and that valve returns to its neutral position again closing off the space between the two forging pistons. When the cam shaft reaches its 285° position it reverses the energization of the windings of the valve T, returning that valve to the position illustrated in FIGURE 14. The valve T now applies the 1,000 pound pressure to the line 340 in lieu of the 2500 pound pressure. A few degrees later, the cams of the cam shaft motor return the valve S to the position illustrated in FIGURE 14, thereby applying the 1,000 pound pressure to the line 253 leading to the space 185 in the forging cylinder and starting the piston 186 in its upward movement to continue until it reaches its limit of motion. A short time later, the valve U is operated to the right by energizing of its winding $U_a$ thereby connecting the 1,000 pound pressure line 350 to the pipe line 246 that leads to the space between the two forging cylinders. The cylinder 188 is thereby returned to its upper position.

When the cam shaft 320 reaches its 310° position, the switch S is returned to the position illustrated in FIGURE 14, thereby applying pressure to return the two forging dies to their upper position. This strips the forging from the punching dies, which forging then falls onto the tray 265 down where it slides to a rieving bin.

When the cam shaft 320 reaches its 340° position it operates the valve W to restore it to the position illustrated in FIGURE 14, thereby causing the motor 260 to restore the retrieving tray to the position illustrated in FIGURE 7. The machine is now ready for a repetition of the cycle of operation.

It is to be noted that the electromagnetically operated valves and the circuits therefor are such that in the event of an electrical failure during the operation of the machine, that failure will not cause any of the valves to move to alternate positions which might otherwise cause improper operation of the hydraulic mechanisms.

During each cycle of operation of the machine there is a time interval when the cup 114 is in the position illustrated in dot-dash lines of FIGURE 6 and is stationary, while the rest of the machine is going through its cycle of operations. The operator can use this time interval for skimming dross from the surface of the liquid metal in the crucible, or for adding liquid metal to the crucible. Also, during the operation of the machine there is a time when the platen has been lowered, which time is of sufficient duration to permit the operator from time to time between different cycles (not necessarily consecutive cycles) to spray the cavities in the dies 132 with a suitable mold release agent, as previously set forth.

A vacuum is continuously applied to the air line 220 through connection including a needle valve and a gauge as in FIGURE 1. If desired, an arrangement may be provided to air flush the air passageways between cycles, whenever desired, by momentarily connecting to the line 220 an air line supplying air thereto of the pressure of the order of 80 pounds per square inch. This would be applied at a time when the dies are separated from one another. This 80 pound air pressure may also carry with it a stream or mist of the mold release agent.

While the machine of the present invention has been made particularly for the forming of forgings from metal such as brass, it is within the purview of the present invention to use other metals in the crucible 114', for instance aluminum. It is to be noted that the tubes 145 are immersed in the liquid metal only short periods of time during each cycle. As a result, the life of these tubes is increased.

While in the above description we have spoken of the structure 200 as constituting a counterpunch, this invention can be utilized without employing a counterpunch and by small changes of the structure 200 and the operating mechanism therefor, it is possible to cause the modified structure 200 to produce a protuberance or flange on the casting during the forging operation. This is illustrated in FIGURE 15 wherein we have employed reference numerals similar to those employed in FIGURE 8, but with a prime added for parts that have been modified from those previously described. The pressure in the chamber 183 of the forging cylinder is maintained at the exhaust pressure of the oil system so that the piston 186 is in its lowermost position during the filling of the cavity in the die 132. In this instance the structure 200' which corresponds to the structure 200, is somewhat shorter than the counterpunch 200 so that the bottom edge 200a thereof is flush with the bottom of the punch 192 when the piston 186 is in its lowermost position. After the mold cavity has been filled with molten metal and that metal has solidified, the forging operation is commenced. In this instance the chamber 189 is not maintained closed. Instead, the valve that controls the application of oil under pressure to that space, when necessary, is in such a position as to permit the free escape of oil therefrom. Oil under 2500 pounds pressure is applied to the top of the piston 188 which commences the forging operation, whereupon the punch 192 commences to descend. At the same time, oil under pressure is applied to the space 183 below the piston 188 to raise the sleeve 200', so that its bottom is in the position located at 200a in FIGURE 16, leaving an air space between the bottom 200a and the top of the hot solid metal in the die cavity. The descent of the punch 192 extrudes or forces the solid hot plastic metal, causing it to flow into the space created by the withdrawal of the bottom of the sleeve 200' between the punch 192 and the die 208' to form a ring 200b. The forging operation continues as before to form a through hole in the metal in the die cavity, the excess material being forced through the gate 144 as before. By this arrangement it is possible to forge the sleeve 200b as an integral part of the casting and at the same time avoid the possible cracking of the sleeve forming metal if the same were formed around a metal core during the casting operation. In this arrangement we have shown the punch 193 and the structure 200' actuated by a forging cylinder piston like the cylinder 106 and the piston 188 for convenience of illustration. Of course other arrangement may be used.

In the casting of some metals in permanent molds, of which aluminum and aluminum alloys are examples, difficulties are encountered if an attempt is made to make a casting with a hole therein formed by a permanent core. This is due to the fact that the cooling, and therefore shrinking metal is restricted in its shrinkage by the metal core and frequently sets up undesirable stresses in the metal. In using the present invention in connection with such metals, this problem is eliminated because no core is used, and the necessary bore or cavity that may have to be formed in the end product is formed by the punching operation after the metal has solidified.

In the description above given with respect to the cams on the cam motor, the extent of those cams as herein specified has been merely for illustrative purposes. Any other angular relationship of cams may be used to give whatever sequence of operation of the motor parts is desirable.

In compliance with the requirements of the patent statutes, we have herein shown and described a preferred embodiment of our present invention. This is merely illustrative of the principles of the invention. What is considered new and sought to be secured by Letters Patent is:

1. A method which comprises flowing liquid metal into a closed mold from the bottom thereof without turbulence from a source of liquid metal which is under pressure that is greater than the pressure in the mold, and controlling the rate of movement of air out of the mold to control the rate of flow of metal into the mold, upon filling of the mold increasing the difference between the pressure in the mold and the pressure on said source of liquid, allowing the metal to solidify in the mold, and while the solidified metal is still hot in the mold applying pressure thereto to cause the solid metal thereof to flow and change the shape of the solidified metal.

2. A method which comprises flowing liquid metal into a cavity in a mold through an opening therein, and after solidification of the surface of the metal in the mold subjecting that metal at an area thereof which is spaced from said opening by a part of the mold wall to a pressure sufficient to force the surface of the solidified metal into more faithful conformance with the surface of the cavity of the mold and to eject some of the solidified metal from the rest of the metal in the mold cavity through the opening.

3. A method of making a metal casting, said method comprising casting liquid metal in the cavity of a mold that has a gateway for the entry of liquid metal into the mold cavity, and when the liquid metal has sufficiently soldified to be form-sustaining but is still at an elevated temperature, subjecting the casting while in the mold to mechanical pressure sufficient to flow the solid metal of the casting of the casting into a different shape than it had at its initial solidification by pressing a movable member into the solidified casting to flow the metal thereof, and then while holding said member against retraction, punching a hole through the casting to the gateway and of a size and shape which is the same as that of the gateway and thereby severing the metal in the gateway from the metal casting in the mold.

4. Apparatus comprising means for casting molten metal in a mold having a mold cavity and a gate opening for entry of liquid metal thereinto, and means for imposing mechanical pressure on the casting in the mold to change the shape of the casting and form a hole in the casting said last means including a punch having a punching end of a shape and size that is a counterpart of the shape and size of the gate opening in the molding cavity, and means for moving the punch to move the punching end thereof through the mold cavity to the gate opening therein and severing the metal in the gate opening from the metal in the mold cavity.

5. Apparatus for casting metal comprising a mold having a heat conductivity substantially that of copper and having a closed mold cavity that has a gate adjacent to the bottom thereof for the entry of molten metal thereinto; means for cooling the mold cavity wall to a temperature below the melting point of the metal being cast, means for causing a non-turbulent flow of liquid metal into the mold cavity through the gate and to fill the mold cavity, means effective after filling of the mold cavity and solidification of the molten metal therein to enter said cavity and thereby change the shape thereof and impose pressure on the casting in an amount sufficient to penetrate into the solidified metal to form therein a depression of the shape of the penetrating means and cause the metal of the casting to flow to the new shape of the mold cavity.

6. In combination with a machine for punching metal including a punch and a die having a hole of a shape that is a counterpart of the cross section of the punching end of the punch and in the path of movement thereof, means forming a molding cavity between the punching end of the punch and the die, said means including the die and the end of the punch, the hole in the die being in communication with the interior of the mold cavity for the ejection of punched metal through said hole, means forming a gate for the flowing of molten metal through said hole into the mold cavity, means for causing molten metal to flow through the gate into the mold cavity, means for moving the punch into the mold cavity to the hole to form a hole in the metal being cast and to eject the surplus metal through the gate, and means for pausing a predetermined time between the operation of the means for causing the flow of molten metal into the mold and the operation of moving the punch into the mold.

7. In combination with a machine for punching metal including a punch and a die having a hole of a shape that is a counterpart of the cross section of the punching end of the punch and in the path of movement thereof, a counterpunch surrounding the punch, means forming a molding cavity between the punching end of the punch and the die, said means including the die and the punching end of the punch and of the counterpunch, the hole in the die being in communication with the interior of the mold cavity for the ejection of punched metal through said hole, means forming a gate for the flowing of molten metal through said hole into the mold cavity, means for causing molten metal to flow through the gate into the mold cavity, means for moving the punch and counterpunch different distances into the mold cavity, and means for pausing a predetermined time interval between the operation of the means for causing the flow of molten metal into the mold and the operation of moving the punch and counterpunch into the mold cavity.

8. In combination with a machine for punching metal including a punch and a die having a hole of a shape that is a counterpart of the cross section of the punching end of the punch and in the path of movement thereof, a counterpunch surrounding the punch, means forming a molding cavity between the punching end of the punch and the die, said means including the die and the punching end of the punch and of the counterpunch, the hole in the die being in communication with the interior of the mold cavity for the ejection of punched metal through said hole, means forming a gate for the flowing of molten metal through said hole into the mold cavity, means for moving the punch in its punching operation up to the hole in the die to form a hole extending through the metal cast in the mold and to sever the metal in the gate from the metal cast in the mold, means for initiating the operation of said punch moving means a time interval after filling of the mold cavity to allow time for solidification of the molten metal in the mold cavity, means controlled by movement of the punch for moving the counterpunch, and means for disabling said last means before the punch completes its punching operation whereby the continued movement of the punch becomes ineffective to cause further movement of the counterpunch.

9. A method which comprises casting metal in a closed mold cavity by filling the cavity with liquid metal to be cast, then after at least some solidification of the metal in the mold, increasing the size of the mold cavity, then while the metal is still in the mold forging it to flow solidified metal into the space created by said increased size.

(References on following page)

References Cited by the Examiner

UNITED STATES PATENTS

| | | | |
|---|---|---|---|
| 1,222,786 | 4/1917 | Morris | 22—67 |
| 1,458,294 | 6/1923 | Hook | 78—9 |
| 1,912,965 | 6/1933 | Brownstein | 29—529 X |
| 2,112,342 | 3/1938 | Lester | 22—92 |
| 2,181,157 | 11/1939 | Smith | 22—68 |
| 2,396,108 | 3/1946 | Loewy | 78—9 |
| 2,726,560 | 12/1955 | Roux | 78—9 |
| 2,821,757 | 2/1958 | Wood | 22—69 |
| 2,852,822 | 9/1958 | Strom | 22—73 |
| 2,864,140 | 12/1958 | Morgenstern | 22—73 |
| 3,070,857 | 1/1963 | Venus | 22—73 |
| 3,078,528 | 2/1963 | Sunday et al. | 22—58 X |
| 3,120,038 | 2/1964 | Lauth | 22—67 |

J. SPENCER OVERHOLSER, *Primary Examiner.*

WINSTON A. DOUGLAS, MARCUS U. LYONS, MICHAEL V. BRINDISI, *Examiners.*